(12) United States Patent
Weinberg

(10) Patent No.: US 10,429,496 B2
(45) Date of Patent: Oct. 1, 2019

(54) HYBRID FLASH LIDAR SYSTEM

(71) Applicant: Analog Devices, Inc., Norwood, MA (US)

(72) Inventor: Harvey Weinberg, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 404 days.

(21) Appl. No.: 15/166,360

(22) Filed: May 27, 2016

(65) Prior Publication Data

US 2017/0343653 A1 Nov. 30, 2017

(51) Int. Cl.
| | |
|---|---|
| *G01S 7/48* | (2006.01) |
| *G01S 7/486* | (2006.01) |
| *G01S 7/497* | (2006.01) |
| *G01S 17/10* | (2006.01) |
| *G01S 7/484* | (2006.01) |

(52) U.S. Cl.
CPC ........... *G01S 7/4865* (2013.01); *G01S 7/484* (2013.01); *G01S 7/4863* (2013.01); *G01S 7/497* (2013.01); *G01S 17/10* (2013.01)

(58) Field of Classification Search
CPC ........... G01B 11/2518; G01B 11/2527; G01B 11/2536; G01S 7/4815; G01S 7/4818; G01S 7/484; G01S 7/486; G01S 7/499; G01S 17/48

See application file for complete search history.

(56) References Cited

U.S. PATENT DOCUMENTS

| | | |
|---|---|---|
| 7,295,298 B2 | 11/2007 | Willhoeft et al. |
| 7,345,271 B2 | 3/2008 | Boehlau et al. |
| 7,570,793 B2 | 8/2009 | Lages et al. |
| 7,684,590 B2 | 3/2010 | Kämpchen et al. |
| 8,072,581 B1 | 12/2011 | Breiholz |
| 8,730,457 B2 | 5/2014 | Rothenberger |
| 8,730,458 B2 | 5/2014 | Hammes |
| 8,736,818 B2 | 5/2014 | Weimer et al. |
| 9,086,275 B2 | 7/2015 | Weinberg et al. |
| 9,423,244 B2 | 8/2016 | Haberer |
| 2004/0119838 A1* | 6/2004 | Griffis .............. G01S 7/486 348/215.1 |
| 2012/0038903 A1* | 2/2012 | Weimer .............. G01C 3/08 356/4.07 |
| 2018/0074196 A1 | 3/2018 | Weinberg |

\* cited by examiner

*Primary Examiner* — Luke D Ratcliffe
(74) *Attorney, Agent, or Firm* — Schwegman Lundberg & Woessner, P.A.

(57) ABSTRACT

Improved flash light detection and ranging (also referred to herein as "flash LIDAR") systems and methods for determining the distance to a target object disposed in a field-of-view. A flash LIDAR system can include an array of illuminators, an array of light detectors, and a signal processor/controller, as well as have a field-of-view in which a target object may be disposed. The flash LIDAR system can effectively divide the field-of-view into a plurality of segments, and each illuminator in the illuminator array can be made to correspond to a specific segment of the field-of-view. The flash LIDAR system can also effectively divide the light detector array into a plurality of subsets of light detectors. Like the respective illuminators in the illuminator array, each subset of light detectors in the light detector array can be made to correspond to a specific segment of the field-of-view.

27 Claims, 16 Drawing Sheets

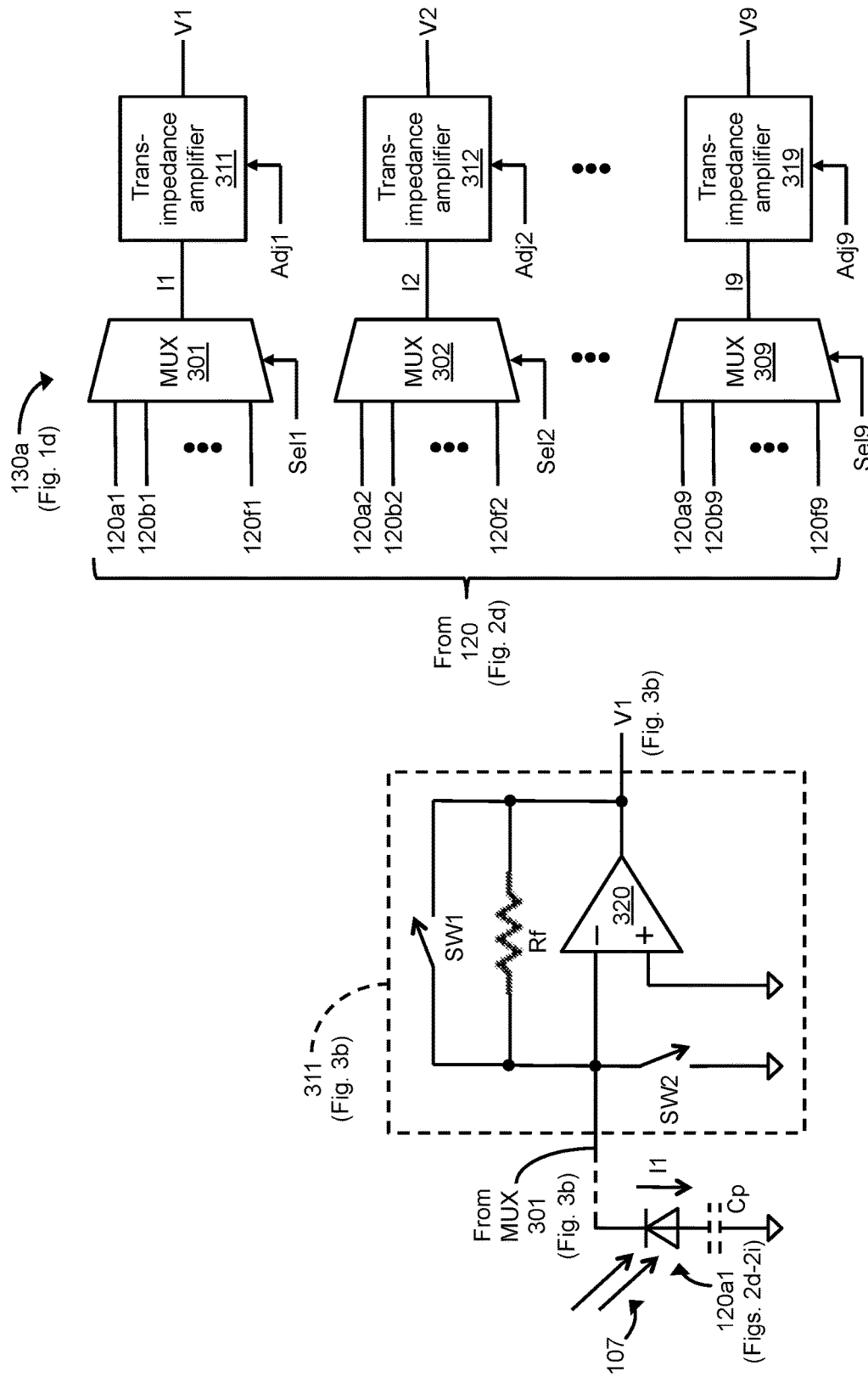

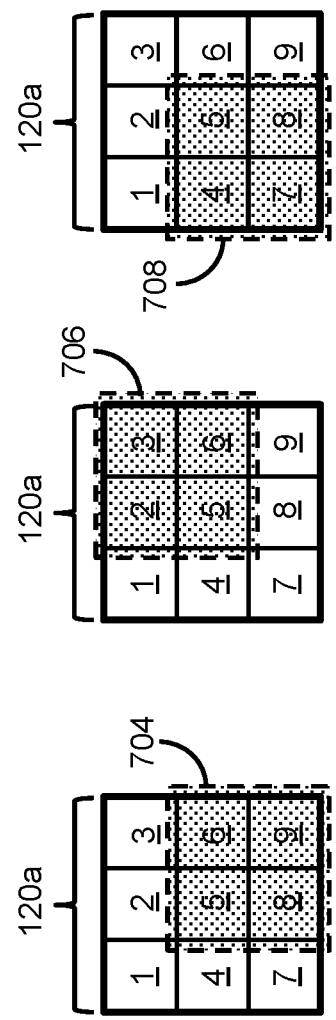
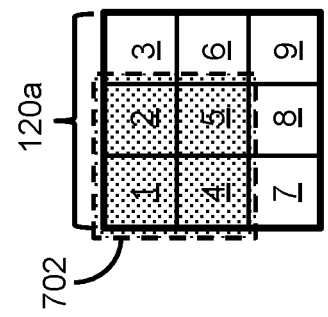

HYBRID FLASH LIDAR SYSTEM

FIELD OF THE DISCLOSURE

The present application relates generally to flash LIDAR systems and methods, and more specifically to flash LIDAR systems and methods that employ a segmented field-of-view, and can scan the field-of-view in segments using randomization in illumination time and/or illumination direction.

BACKGROUND

Flash light detection and ranging (also referred to herein as "flash LIDAR") systems and methods are known that employ an illumination source to direct pulsed beams of light toward a target object within a field-of-view, and a light detector array to receive light reflected from the target object. For each pulsed beam of light directed toward the target object, the light detector array can receive reflected light corresponding to a frame of data. Further, using one or more frames of data, the range or distance to the target object can be obtained by determining the elapsed time between transmission of the pulsed beam of light by the illumination source and reception of the reflected light at the light detector array. Such flash LIDAR systems and methods have been employed in numerous and diverse automotive, industrial, and military applications.

A conventional flash LIDAR system can include an illumination source, a light detector array, and a controller. The illumination source can include a single illuminator (e.g., a laser) or an array of illuminators, and the light detector array can include an array of pixel receiver elements (e.g., photodiodes). In a typical mode of operation, the controller can operate the illumination source to produce one or more pulsed beams of light, and steer the pulsed beams of light in one or more directions in order to illuminate a field-of-view having a target object disposed therein. For example, the controller may steer the pulsed beams of light by moving the illuminator or the array of illuminators. Alternatively, the flash LIDAR system may include a moveable mirror, and the controller may move the mirror in order to sweep the pulsed beams of light produced by the illuminator(s) across the field-of-view in raster scan fashion. The flash LIDAR system may alternatively be configured to include a multiplicity of linearly arranged illuminator/light detector pairs, and the controller may rotate the illuminator/light detector pair arrangement up to 360 degrees in order to illuminate the field of view and receive light reflected from the target object. While illuminating the field-of-view and receiving the reflected light, the flash LIDAR system can obtain a frame of data for each pulsed beam of light produced by the illumination source, and, using the frames of data, determine range information pertaining to the distance to the target object.

SUMMARY OF THE DISCLOSURE

In accordance with the present application, improved flash light detection and ranging (also referred to herein as "flash LIDAR") systems and methods are disclosed for determining the distance to a target object disposed in a field-of-view. In one aspect, a flash LIDAR system can include an array of illuminators, an array of light detectors, and a signal processor/controller, as well as have a field-of-view in which a target object may be disposed. The flash LIDAR system can effectively divide the field-of-view into a plurality of segments, and can illuminate, in turn, each segment of the field-of-view with one or more pulsed beams of light using a respective illuminator in the illuminator array. Each illuminator in the illuminator array can correspond to a specific segment of the field-of-view, and can be used to selectively illuminate its corresponding segment of the field-of-view under control of the signal processor/controller. The signal processor/controller can control the respective illuminators in the illuminator array to scan the field-of-view in segments using randomization in illumination time and/or illumination direction. The flash LIDAR system can also effectively divide the array of light detectors into a plurality of subsets of light detectors. Like the respective illuminators in the illuminator array, each subset of light detectors in the light detector array can correspond to a specific segment of the field-of-view. As the respective illuminators scan the field-of-view in segments and illuminate each segment with one or more pulsed beams of light, each subset of light detectors can receive light reflected from at least a portion of a target object disposed in its corresponding segment of the field-of-view. Having scanned the field-of-view in segments and received light reflected from the target object in at least some of the segments, the signal processor/controller can, for each segment, obtain a frame of data for each pulsed beam of light received from the segment, and, using the frames of data obtained for the respective segments, determine range information pertaining to the distance to the target object. By effectively dividing its field-of-view into a plurality of segments, obtaining a frame of data for each pulsed beam of light received from a respective segment, and determining range information pertaining to the distance to the target object using the frames of data obtained for the respective segments, the disclosed flash LIDAR system can advantageously improve its range of operation. Moreover, by scanning the field-of-view in segments using randomization in illumination time and/or illumination direction, the disclosed flash LIDAR system can advantageously provide improved jamming resistance.

In certain embodiments, a flash LIDAR system is disclosed that has a field-of-view configured to encompass at least a portion of a target object. The flash LIDAR system includes a flash illuminator array including a plurality of illuminators, a flash detector array including a plurality of light detectors, and a signal processor/controller. The flash detector array is divided into a plurality of subsets of light detectors, and the field-of-view is divided into a plurality of segments. The plurality of illuminators are operative to illuminate corresponding segments, respectively, of the field-of-view, and to transmit, in turn, one or more light beam pulses toward the corresponding segments, respectively, of the field-of-view. The plurality of subsets of light detectors are operative, in response to the one or more light beam pulses transmitted, in turn, by the respective illuminators, to receive one or more reflected light beam pulses from the plurality of segments, respectively, of the field-of-view. The signal processor/controller is operative to determine an elapsed time between transmission of the one or more light beam pulses by the respective illuminators and reception of the one or more reflected light beam pulses at the respective subsets of light detectors in order to obtain a range to the target object.

In certain further embodiments, a method of operating a flash LIDAR system is disclosed, in which the flash LIDAR system has a field-of-view configured to encompass at least a portion of a target object. The method includes providing the flash LIDAR system, including a flash illuminator array having a plurality of illuminators, a flash detector array having a plurality of light detectors, and a signal processor/controller. The flash detector array is divided into a plurality of subsets of light detectors, and the field-of-view is divided into a plurality of segments. The method further includes illuminating, by the plurality of illuminators, corresponding segments, respectively, of the field-of-view by transmitting, in turn, one or more light beam pulses toward the corresponding segments, respectively, of the field-of-view. The method still further includes, in response to the one or more light beam pulses transmitted, in turn, by the respective illuminators, receiving, by the plurality of subsets of light detectors, one or more reflected light beam pulses from the plurality of segments, respectively, of the field-of-view. The method also includes determining, by the signal processor/controller, an elapsed time between transmission of the one or more light beam pulses by the respective illuminators and reception of the one or more reflected light beam pulses at the respective subsets of light detectors in order to obtain a range to the target object.

In certain additional embodiments, a method of calibrating a flash LIDAR system is disclosed. The method includes providing the flash LIDAR system, including a flash illuminator array having a plurality of illuminators, a flash detector array having a plurality of light detectors, and a signal processor/controller. The method further includes transmitting, by the plurality of illuminators, in turn, one or more light beam pulses toward a calibration reflector, which has a substantially uniform reflector surface. The method still further includes, in response to the one or more light beam pulses transmitted, in turn, by the respective illuminators, receiving, at the plurality of light detectors, one or more reflected light beam pulses from the calibration reflector, and measuring, by the signal processor/controller, a plurality of light intensity levels at the plurality of light detectors, respectively, of the flash detector array. The method also includes mapping out, by the signal processor/controller, a plurality of subsets of light detectors on the flash detector array based on the measured light intensity levels. Each subset of light detectors is for use in receiving further reflected light beam pulses in response to further transmitted light beam pulses from a respective illuminator.

Other features, functions, and aspects of the present application will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings:

FIG. 1b is a timing diagram illustrating exemplary light beam pulses that can be transmitted by the flash LIDAR system of FIG. 1a;

FIG. 1c is a timing diagram illustrating an exemplary reflected light beam pulse that can be received by the flash LIDAR system of FIG. 1a;

FIG. 1d is a block diagram of the flash LIDAR system of FIG. 1a;

FIG. 2a is a diagram of an exemplary segmented field-of-view of the flash LIDAR system of FIG. 1a;

FIG. 2b is a diagram of an exemplary array of illuminators included in the flash LIDAR system of FIG. 1a;

FIG. 2c is a diagram of an exemplary array of light detectors included in the flash LIDAR system of FIG. 1a;

FIGS. 2d-2i are diagrams illustrating an exemplary scenario of using the flash LIDAR system of FIG. 1a;

FIG. 3a is a schematic diagram of an exemplary transimpedance amplifier included in the flash LIDAR system of FIG. 1a;

FIG. 3b is a schematic diagram of exemplary multiplexor/trans-impedance amplifier pairs included in the flash LIDAR system of FIG. 1a;

FIG. 3c is a schematic diagram of exemplary signal processing/control circuitry included in the flash LIDAR system of FIG. 1a;

FIG. 4 is a flow diagram of an exemplary method of operating the flash LIDAR system of FIG. 1a;

FIG. 6 is a diagram illustrating a first exemplary scenario of calibrating the array of light detectors of FIG. 2c;

FIGS. 7a-7d are diagrams illustrating a second exemplary scenario of calibrating the array of light detectors of FIG. 2c.

DETAILED DESCRIPTION

Figure 1D:
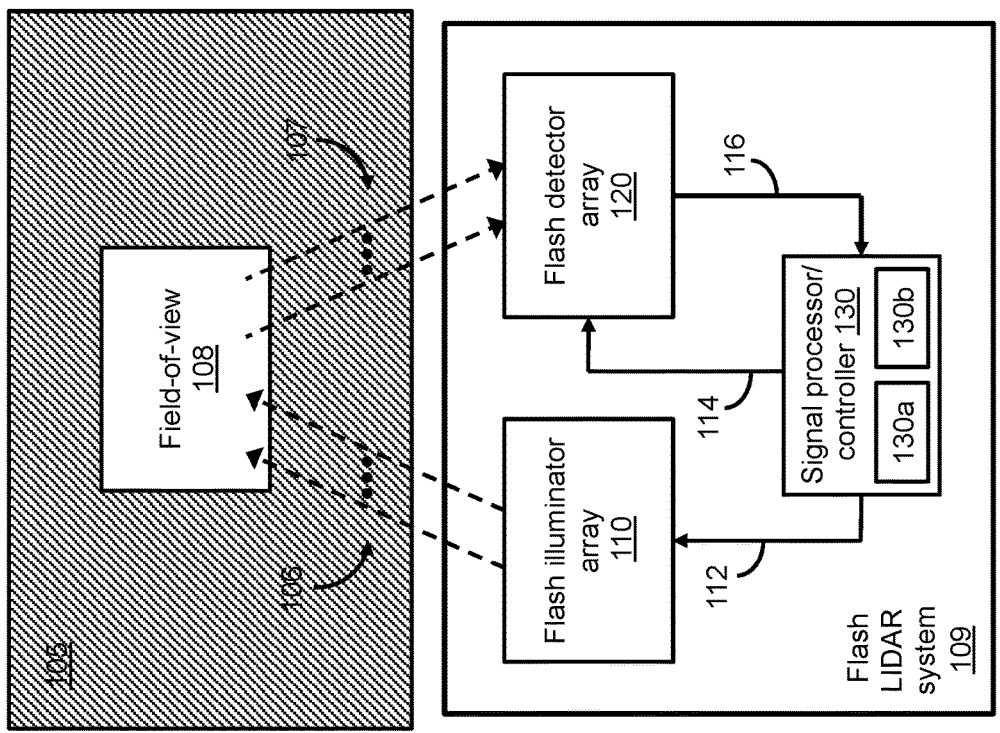

Improved flash light detection and ranging (also referred to herein as "flash LIDAR") systems and methods are disclosed for determining the distance to a target object disposed in a field-of-view. In one embodiment, a flash LIDAR system is disclosed that can include an array of illuminators, an array of light detectors, and a signal processor/controller, as well as have a field-of-view in which a target object may be disposed. The flash LIDAR system can effectively divide the field-of-view into a plurality of segments, and each illuminator in the illuminator array can be made to correspond to a specific segment of the field-of-view. The flash LIDAR system can also effectively divide the light detector array into a plurality of subsets of light detectors. Like the respective illuminators in the illuminator array, each subset of light detectors in the light detector array can be made to correspond to a specific segment of the field-of-view.

The disclosed flash LIDAR systems and methods can avoid at least some of the drawbacks of conventional flash LIDAR systems and methods, which, during operation, are typically called upon to illuminate an entire field-of-view with one or more pulsed beams of light, and to receive any light reflected from a target object in response to illuminating the entire field-of-view. For such conventional flash LIDAR systems and methods, however, the total area of the field-of-view increases exponentially as the range or distance to the target object increases, reducing the illumination density on the target object and limiting the range of the system.

To improve the range of flash LIDAR systems and methods, the illuminators of the disclosed flash LIDAR system can scan the field-of-view in segments, selectively illuminating each of the smaller areas of the respective segments with one or more pulsed beams of light. Each subset of light detectors of the disclosed flash LIDAR system can then operate to receive light reflected from at least a portion of a target object disposed in its corresponding segment of the field-of-view. Having scanned the field-of-view in segments and received light reflected from the target object in at least some of the segments, the signal processor/controller of the disclosed flash LIDAR system can obtain a frame of data for each reflected pulsed beam of light received from the target object in a respective segment. Using the frames of data, the signal processor/controller can then determine range information pertaining to the distance to the target object. By effectively dividing the field-of-view into a plurality of segments, obtaining a frame of data for each reflected pulsed beam of light received from the target object in a respective segment, and determining range information pertaining to the distance to the target object using the frames of data, the disclosed flash LIDAR system can advantageously mitigate the reduction of illumination density on the target object as the range or distance to the target object increases, thereby improving its range of operation.

Figure 1A:
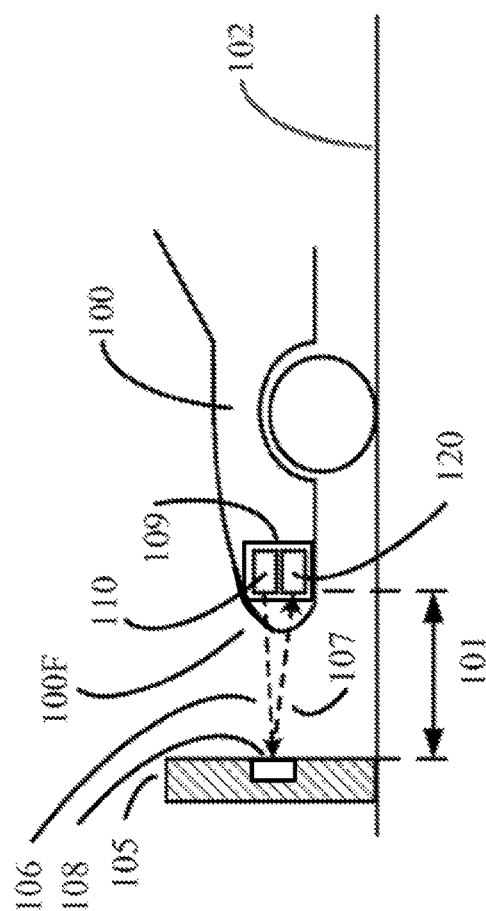
FIG. 1a is a diagram of an exemplary flash light detection and ranging ("flash LIDAR") system implemented in an automobile, in accordance with the present application.

FIG. 1a depicts an illustrative embodiment of an exemplary flash LIDAR system 109 implemented in an automobile 100, in accordance with the present application. It is noted that the flash LIDAR system 109 is described herein with reference to an automotive application for purposes of illustration, and that the flash LIDAR system 109 may alternatively be employed in any other suitable automotive, industrial, or military application. As shown in FIG. 1a, the flash LIDAR system 109 can include a flash illuminator array 110, and a flash detector array 120. For example, the flash illuminator array 110 may include a plurality of infrared (IR) light emitting diodes (LEDs), a plurality of laser diodes, or a plurality of any other suitable illuminators. Further, the flash detector array 120 may include a plurality of pixel receiver elements (e.g., photodiodes), or a plurality of any other suitable light detectors.

In an exemplary mode of operation, while the automobile 100 is traveling or parked on a road 102 or any other suitable surface, the flash illuminator array 110 can transmit one or more light beam pulses 106 directed from the front 100F of the automobile 100 toward a target object 105 (e.g., a wall), illuminating a two-dimensional field-of-view 108 encompassing at least a portion of the target object 105. For each of the light beam pulses 106 directed toward the target object 105, the flash detector array 120 can receive at least one reflected light beam pulse 107 corresponding to at least one frame of data. Using one or more such frames of data, the range or distance 101 from the flash LIDAR system 109 to the target object 105 can be obtained by determining the elapsed time between the transmission of the light beam pulse(s) 106 by the flash illuminator array 110, and the reception of the reflected light beam pulse(s) 107 at the flash detector array 120.

Figure 1B:
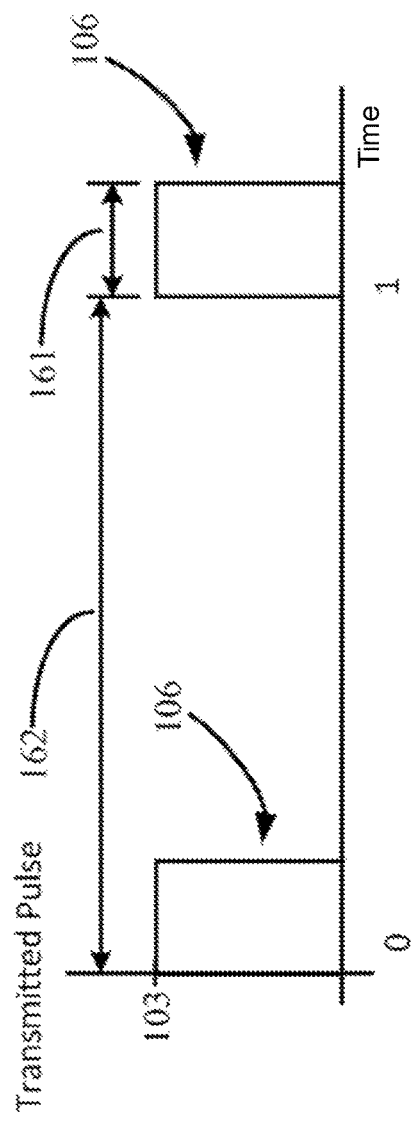

FIG. 1b depicts an exemplary series of light beam pulses 106 that can be transmitted by the flash illuminator array 110 of the flash LIDAR system 109. As shown in FIG. 1b, each of the light beam pulses 106 has a predetermined amplitude 103 and pulse width 161. Further, the series of the light beam pulses 106 can define a period 162 (e.g., from time "0" to time "1"; see FIG. 1b) between the respective light beam pulses 106. Each of the light beam pulses 106 transmitted by the flash illuminator array 110 can at least partially be reflected off of the target object 105 to create a reflected light beam pulse, such as the light beam pulse 107 (see FIG. 1c). It is noted that a transmitted light beam pulse (such as the light beam pulse 106) can dissipate or weaken with the distance of travel from its transmission source. For example, a transmitted electromagnetic signal may weaken with the square of its distance from its transmitter. Similarly, a reflected light beam pulse (such as the light beam pulse 107) may dissipate or weaken with the distance of travel from its point of reflection, which, with reference to the flash LIDAR system 109 (see FIG. 1a), can correspond to the portion of the target object 105 encompassed by the field-of-view 108.

Figure 1C:
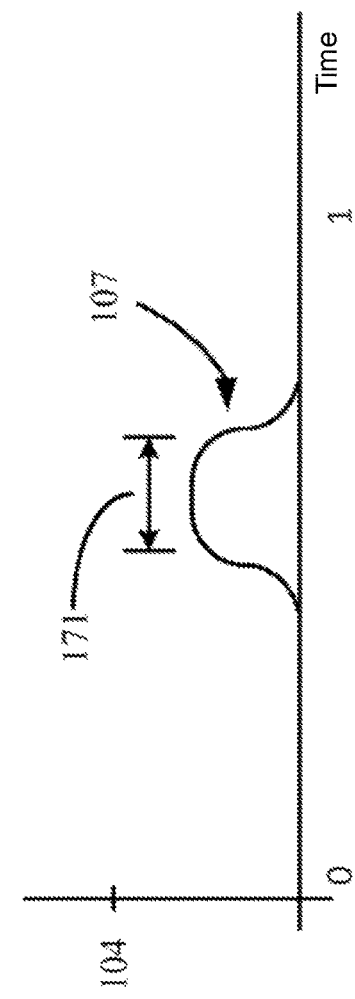

FIG. 1c depicts an exemplary light beam pulse that corresponds to the reflected light beam pulse 107 created by the light beam pulse 106, which can be transmitted by the flash illuminator array 110 at time 0 (see FIG. 1b), and ultimately be reflected off of the target object 105 between time 0 and time 1 (see also FIG. 1c). It is noted that another reflected light beam pulse (not shown) like the light beam pulse 107 of FIG. 1c can be created by the light beam pulse 106 transmitted by the flash illuminator array 110 at time 1 (see FIG. 1b), and ultimately reflected off of the target object 105 at some point after time 1. As shown in FIG. 1c, the light beam pulse 107 has a resulting amplitude 104 and pulse width 171. For example, the light beam pulse 107 may be an infrared light beam pulse that can dissipate or weaken with the square of the distance of travel from its point of reflection (e.g., the portion of the target object 105 encompassed by the field-of-view 108). The amplitude 104 of the reflected light beam pulse 107 may therefore be less than the amplitude 103 of the transmitted light beam pulses 106. It is noted that the elapsed time between the transmission of the light beam pulse 106 by the flash illuminator array 110 and the reception of its corresponding reflected light beam pulse 107 at the flash detector array 120 is also referred to herein as the "time of flight" of the light beam pulses 106, 107.

FIG. 1d depicts an illustrative embodiment of the flash LIDAR system 109 of FIG. 1a. As shown in FIG. 1d, the flash LIDAR system 109 can include the flash illuminator array 110, the flash detector array 120, and a signal processor/controller 130. The signal processor/controller 130 can (1) control, via a control line 112, one or more illuminators of the flash illuminator array 110 to scan the field-of-view 108 with one or more transmitted light beam pulses 106, (2) synchronize, via a control line 114, the transmission of the light beam pulses 106 with reception of one or more reflected light beam pulses 107 at the flash detector array 120, (3) obtain, over a data line 116, a frame of data for each of the reflected light beam pulses 107 received at the flash detector array 120, and, (4) using one or more such frames of data, determine the time of flight of the transmitted/reflected light beam pulses 106, 107 to obtain range information pertaining to the distance 101 from the flash LIDAR system 109 to the target object 105.

In certain embodiments, the flash LIDAR system 109 can effectively divide the two-dimensional field-of-view 108 into a plurality of segments, and each illuminator of the flash illuminator array 110 can be made to illuminate a corresponding segment of the field-of-view 108. For example, the field-of-view 108 may effectively be divided into a plurality of segments 108a-108f (see FIG. 2a) of the total area of the field-of-view 108, or any other suitable plurality of segments of the field-of-view 108. Further, the flash illuminator array 110 may include a plurality of illuminators 110a-110f (see FIG. 2b) that can be used to illuminate the corresponding plurality of segments 108a-108f, respectively, of the field-of-view 108. In certain embodiments, each of the plurality of illuminators 110a-110f of the flash illuminator array 110 can include one illuminating device, or more than one such illuminating device.

Figures 2A, 2B, 2C:
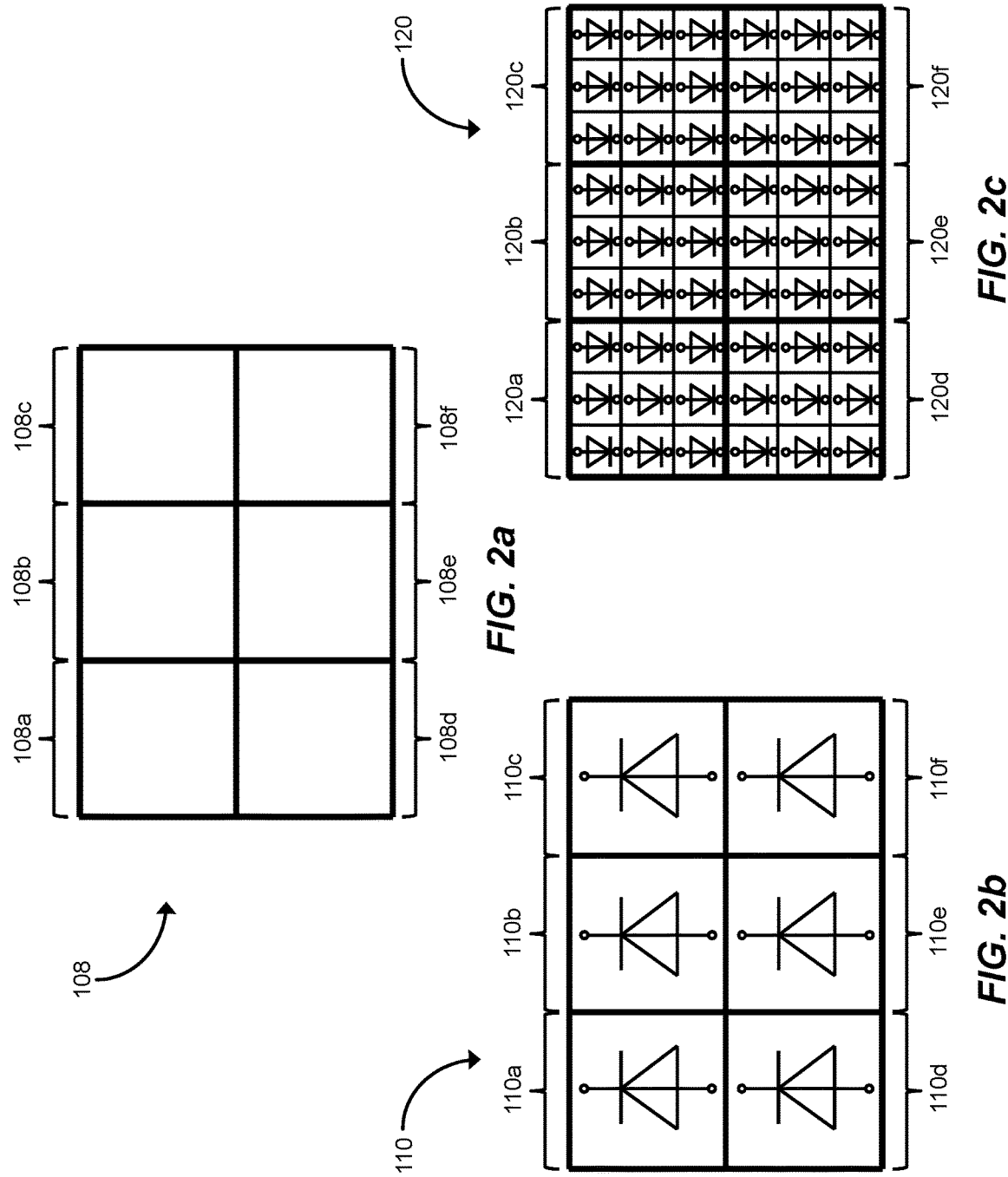

The flash LIDAR system 109 can also effectively divide the flash detector array 120 into a plurality of subsets of light detectors, in which each subset of light detectors of the flash detector array 120 can be used to receive one or more reflected light beam pulses from a corresponding segment of the field-of-view 108. For example, the flash detector array 120 may effectively be divided into a plurality of subsets of light detectors 120a-120f (see FIG. 2c) that can be used to receive reflected light beam pulses from the corresponding plurality of segments 108a-108f, respectively, of the field-of-view 108. Further, each of the plurality of subsets 120a-120f can be mapped out on the flash detector array 120 to include a group of one or more light detectors, such as light detectors 120a1-120a9 included in the subset 120a, light detectors 120b1-120b9 included in the subset 120b, light detectors 120c1-120c9 included in the subset 120c, light detectors 120d1-120d9 included in the subset 120d, light detectors 120e1-120e9 included in the subset 120e, and light detectors 120f1-120f9 included in the subset 120f (see FIGS. 2d-2i). As illustrated in FIGS. 2b and 2c, the total number of light detectors (e.g., photodiodes) included in the plurality of subsets 120a-120f of the flash detector array 120 can exceed the total number of illuminators (e.g., IR LEDs) 110a-110f of the flash illuminator array 110.

The disclosed flash LIDAR system 109 will be further understood with reference to the following illustrative example, and FIGS. 2d-2i. In this example, the signal processor/controller 130 of the flash LIDAR system 109 can control the respective illuminators 110a-110f of the flash illuminator array 110 to scan the total area of the field-of-view 108 in segments, selectively illuminating, in turn, the smaller areas of the respective segments 108a-108f of the field-of-view 108 with transmitted light beam pulses 106a-106f, respectively. Each subset 120a, 120b, 120c, 120d, 120e, or 120f of the flash detector array 120 can then operate to receive, in turn, a reflected light beam pulse 107a, 107b, 107c, 107d, 107e, or 107f from the portion of the target object 105 encompassed by its corresponding segment 108a, 108b, 108c, 108d, 108e, or 108f of the field-of-view 108.

In this example, the signal processor/controller 130 controls the illuminators 110a-110f to selectively illuminate the respective segments 108a-108f in sequence, starting with the segment 108a, and continuing on to the segment 108f. In certain embodiments, the flash LIDAR system 109 can include suitable optics and/or moveable mirrors, as well as implement suitable positioning of the illuminators 110a-110f of the flash illuminator array 110, in order to direct each of the transmitted light beam pulses 106a-106f toward its corresponding segment of the field-of-view 108. In certain further embodiments, the flash illuminator array 110 can be configured such that each of the transmitted light beam pulses 106a-106f can be made to pass through a medium or device (e.g., a lithium niobate (LiNbO$_3$) crystal medium, a liquid crystal waveguide device) having a controllable refraction angle, which can be controlled by the signal processor/controller 130 to direct the transmitted light beam pulse toward its corresponding segment of the field-of-view 108. In this way, the flash LIDAR system 109 can advantageously be implemented with essentially no moving parts.

Figure 2D:
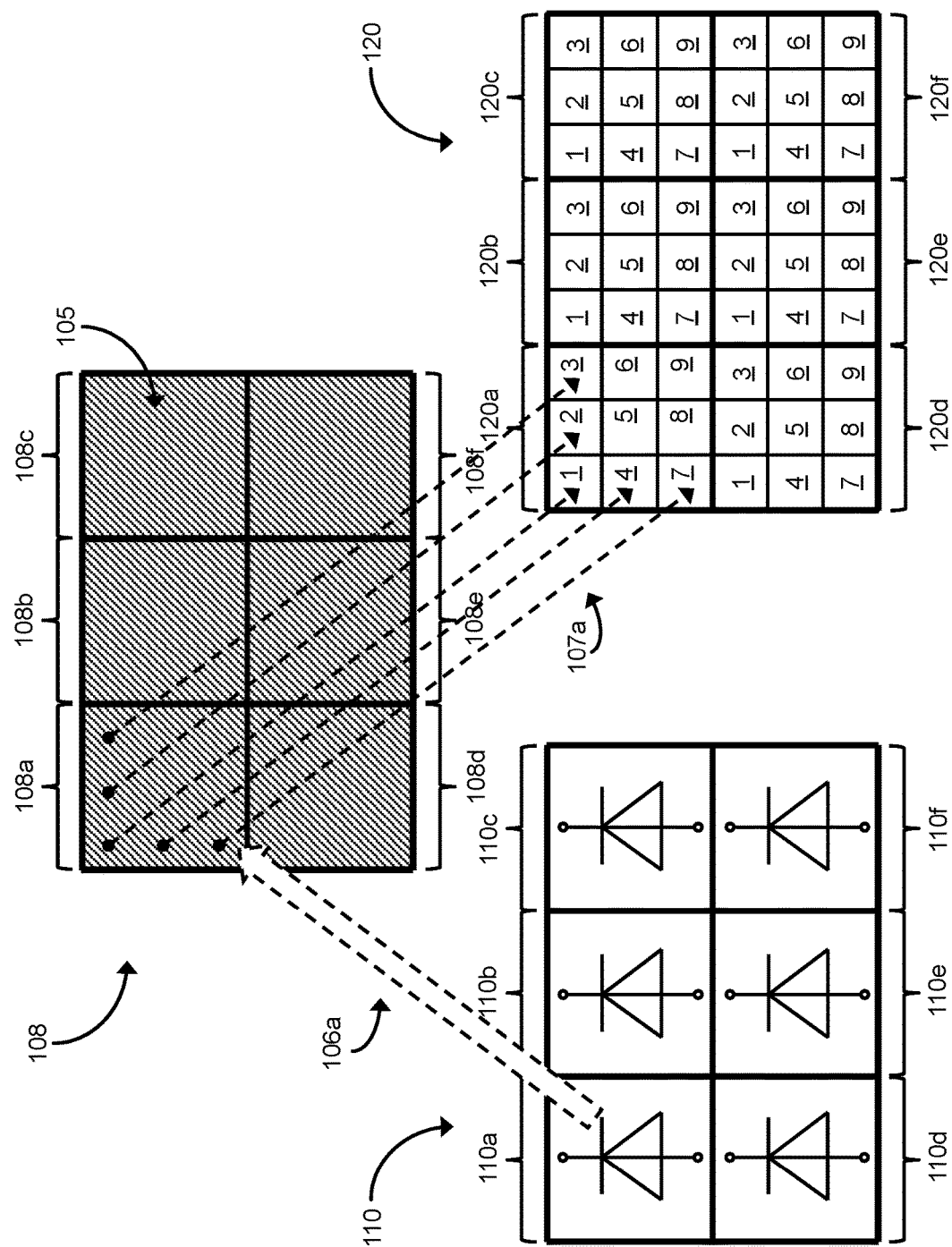

As shown in FIG. 2d, the illuminator 110a of the flash illuminator array 110 can start scanning the total area of the field-of-view 108 by transmitting one or more light beam pulses 106a to illuminate the smaller area of the segment 108a. As described herein, the two-dimensional field-of-view 108 can encompass at least a portion of the target object 105 (e.g., a wall). In this example, the portion of the target object 105 encompassed by the field-of-view 108 can fill an entire area of the field-of-view 108, and therefore the light beam pulses 106a transmitted by the illuminator 110a can impinge upon the target object 105 throughout the smaller area of the segment 108a. For each light beam pulse 106a that impinges upon the portion of the target object 105 encompassed by the segment 108a, the light detectors 120a1-120a9 included in the subset 120a of the flash detector array 120 can each receive a reflected light beam pulse 107a corresponding to a frame of data. It is noted that only the light detectors 120a1-120a4 and 120a7 in the subset 120a of the flash detector array 120 are shown receiving reflected light beam pulses 107a for clarity of illustration, and that the remaining light detectors 120a5, 120a6, 120a8, and 120a9 in the subset 120a can also receive reflected light beam pulses 107a in likewise fashion.

Figure 2E:
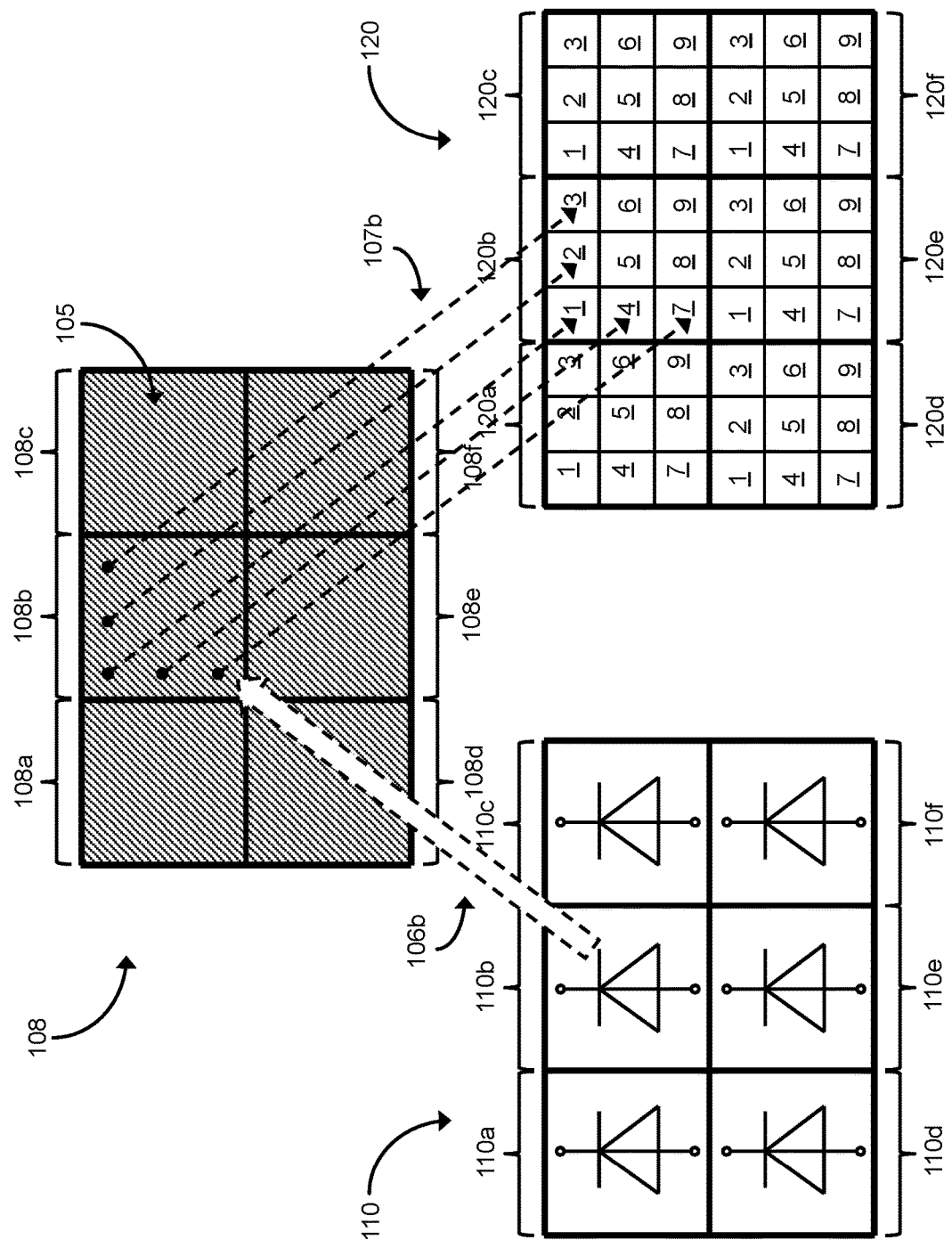

Following the transmission of the light beam pulses 106a by the illuminator 110a of the flash illuminator array 110 and the reception of the reflected light beam pulses 107a at the subset 120a of the flash detector array 120, the illuminator 110b can transmit one or more light beam pulses 106b to illuminate the area of the segment 108b of the field-of-view 108, as shown in FIG. 2e. Because the portion of the target object 105 encompassed by the field-of-view 108 can fill the entire area of the field-of-view 108, the light beam pulses 106b transmitted by the illuminator 110b can impinge upon the target object 105 throughout the smaller area of the segment 108b. For each light beam pulse 106b that impinges upon the portion of the target object 105 encompassed by the segment 108b, the light detectors 120b1-120b9 included in the subset 120b of the flash detector array 120 can each receive a reflected light beam pulse 107b corresponding to a frame of data. It is noted that only the light detectors 120b1-120b4 and 120b7 in the subset 120b of the flash detector array 120 are shown receiving reflected light beam pulses 107b for clarity of illustration, and that the remaining light detectors 120b5, 120b6, 120b8, and 120b9 in the subset 120b can also receive reflected light beam pulses 107b in likewise fashion.

Figure 2F:
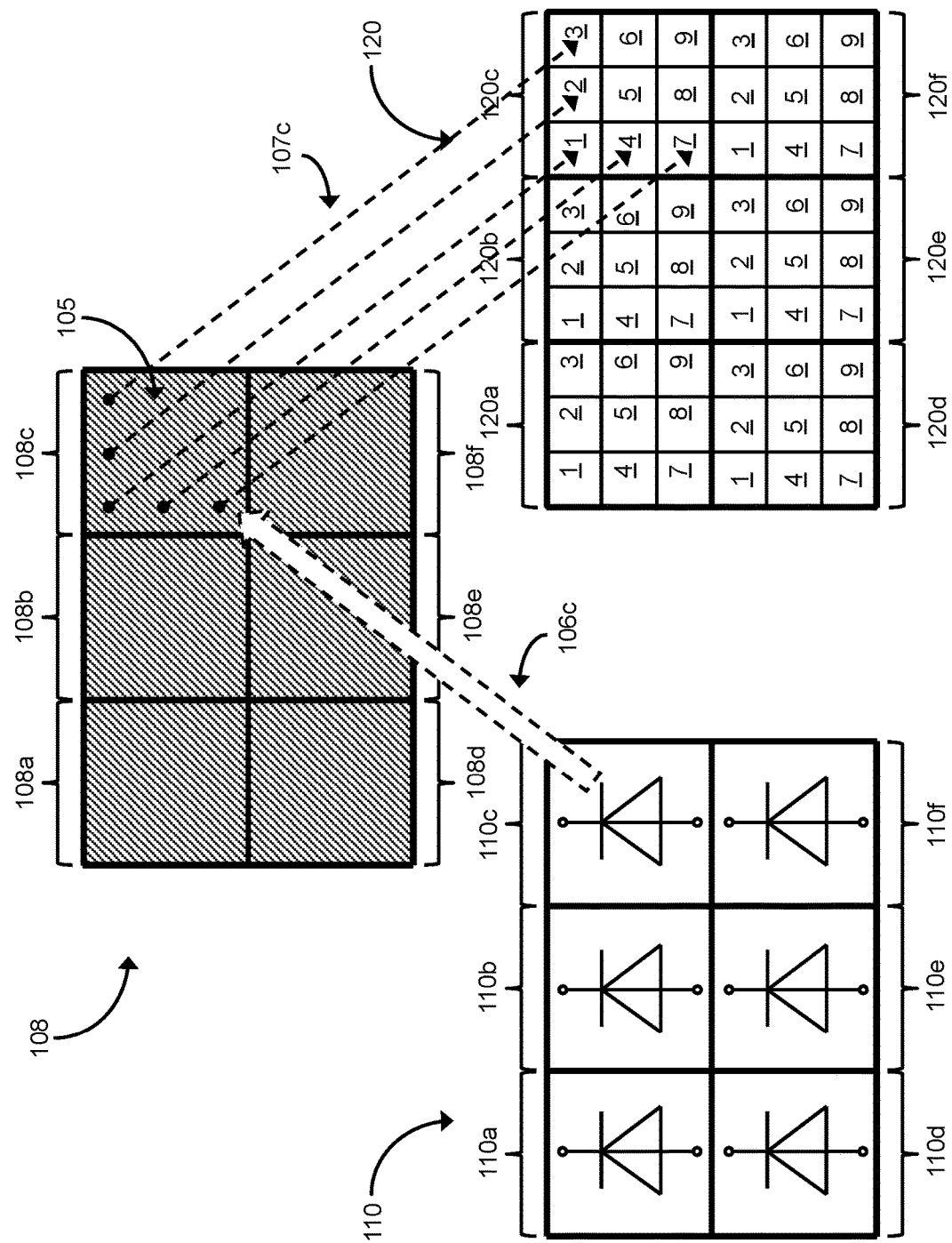

Similarly, following the transmission of the light beam pulses 106b by the illuminator 110b of the flash illuminator array 110 and the reception of the reflected light beam pulses 107b at the subset 120b of the flash detector array 120, the illuminator 110c can transmit one or more light beam pulses 106c to illuminate the area of the segment 108c of the field-of-view 108, as shown in FIG. 2f. Such light beam pulses 106c transmitted by the illuminator 110c can impinge upon the target object 105 throughout the area of the segment 108c. For each light beam pulse 106c that impinges upon the portion of the target object 105 encompassed by the segment 108c, the light detectors 120c1-120c9 included in the subset 120c of the flash detector array 120 can each receive a reflected light beam pulse 107c corresponding to a frame of data. It is noted that only the light detectors 120c1-120c4 and 120c7 in the subset 120c of the flash detector array 120 are shown receiving reflected light beam pulses 107c for clarity of illustration, and that the remaining light detectors 120c5, 120c6, 120c8, and 120c9 in the subset 120c can also receive reflected light beam pulses 107b in likewise fashion.

Figure 2G:
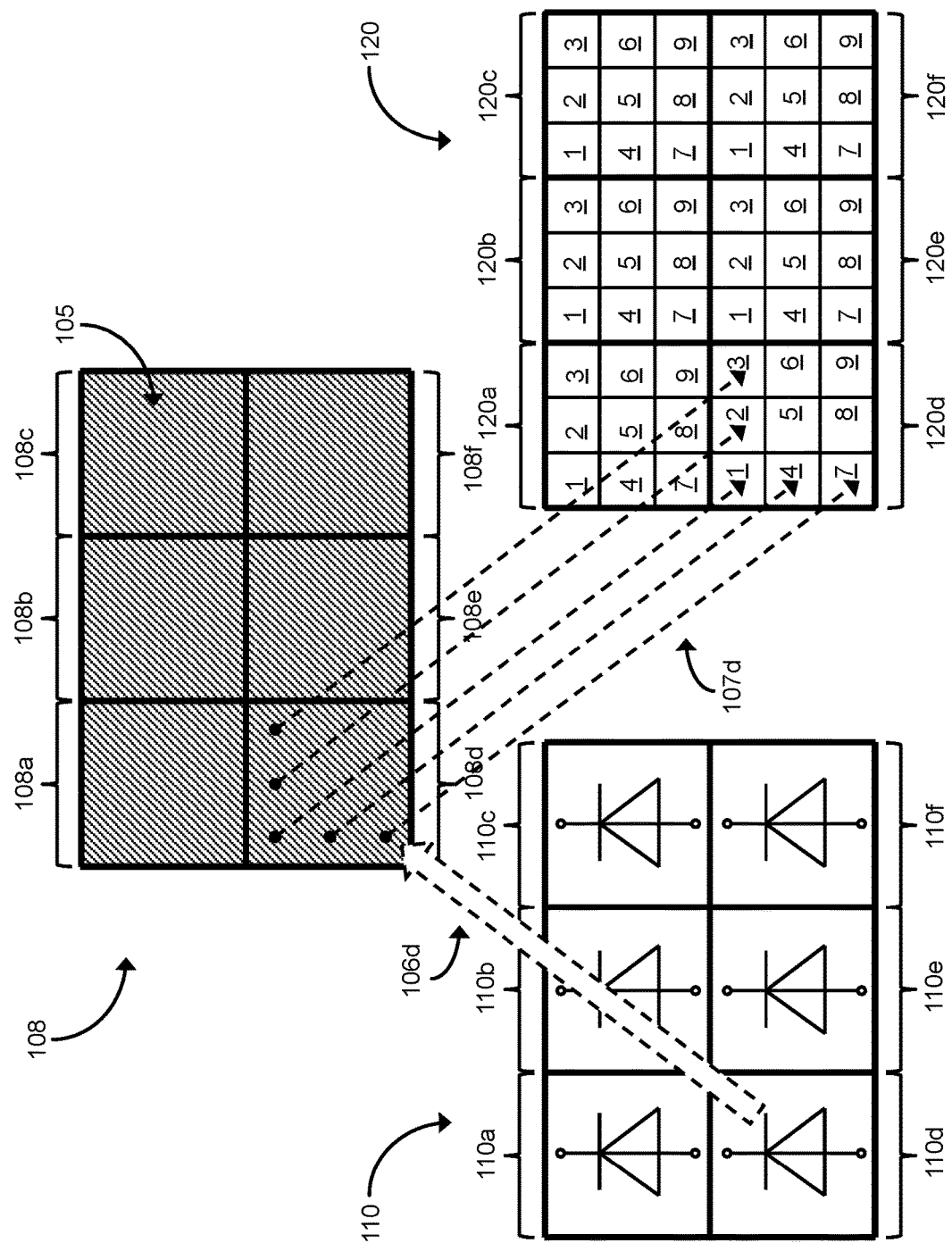

Following the transmission of the light beam pulses 106c by the illuminator 110c of the flash illuminator array 110 and the reception of the reflected light beam pulses 107c at the subset 120c of the flash detector array 120, the illuminator 110d can transmit one or more light beam pulses 106d to illuminate the area of the segment 108d, as shown in FIG. 2g. Such light beam pulses 106d transmitted by the illuminator 110d can impinge upon the target object 105 throughout the area of the segment 108d. For each light beam pulse 106d that impinges upon the portion of the target object 105 encompassed by the segment 108d, the light detectors 120d1-120d9 included in the subset 120d of the flash detector array 120 can each receive a reflected light beam pulse 107d corresponding to a frame of data. It is noted that only the light detectors 120d1-120d4 and 120d7 in the subset 120d of the flash detector array 120 are shown receiving reflected light beam pulses 107d for clarity of illustration, and that the remaining light detectors 120d5, 120d6, 120d8, and 120d9 in the subset 120d can also receive reflected light beam pulses 107d in likewise fashion.

Figure 2H:
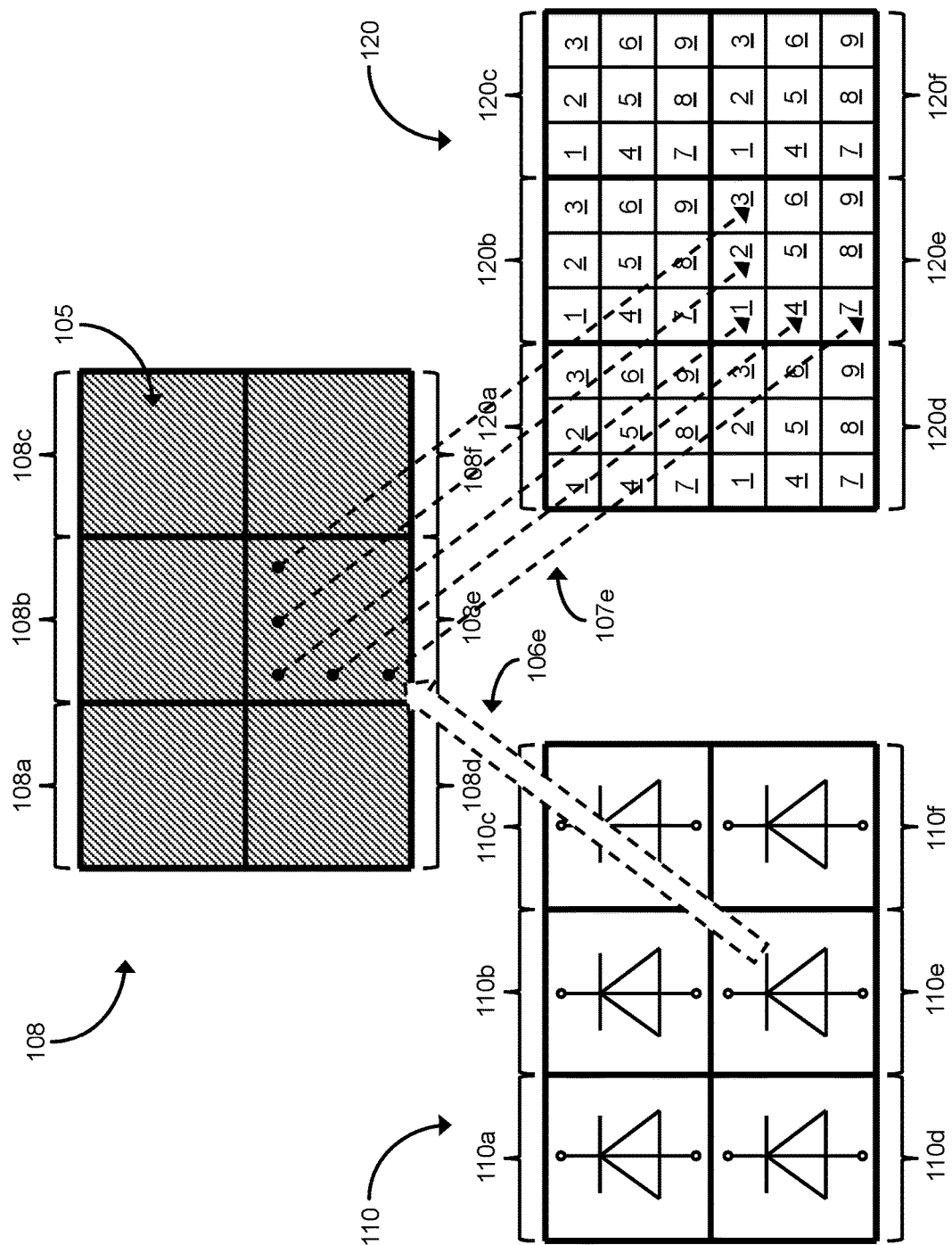

Similarly, following the transmission of the light beam pulses 106d by the illuminator 110d of the flash illuminator array 110 and the reception of the reflected light beam pulses 107d at the subset 120d of the flash detector array 120, the illuminator 110e can transmit one or more light beam pulses 106e to illuminate the area of the segment 108e, as shown in FIG. 2h. Such light beam pulses 106e transmitted by the illuminator 110e can impinge upon the target object 105 throughout the area of the segment 108e. For each light beam pulse 106e that impinges upon the portion of the target object 105 encompassed by the segment 108e, the light detectors 120e1-120e9 included in the subset 120e of the flash detector array 120 can each receive a reflected light beam pulse 107e corresponding to a frame of data. It is noted that only the light detectors 120e1-120e4 and 120e7 in the subset 120e of the flash detector array 120 are shown receiving reflected light beam pulses 107e for clarity of illustration, and that the remaining light detectors 120e5, 120e6, 120e8, and 120e9 in the subset 120e can also receive reflected light beam pulses 107e in likewise fashion.

Figure 2I:
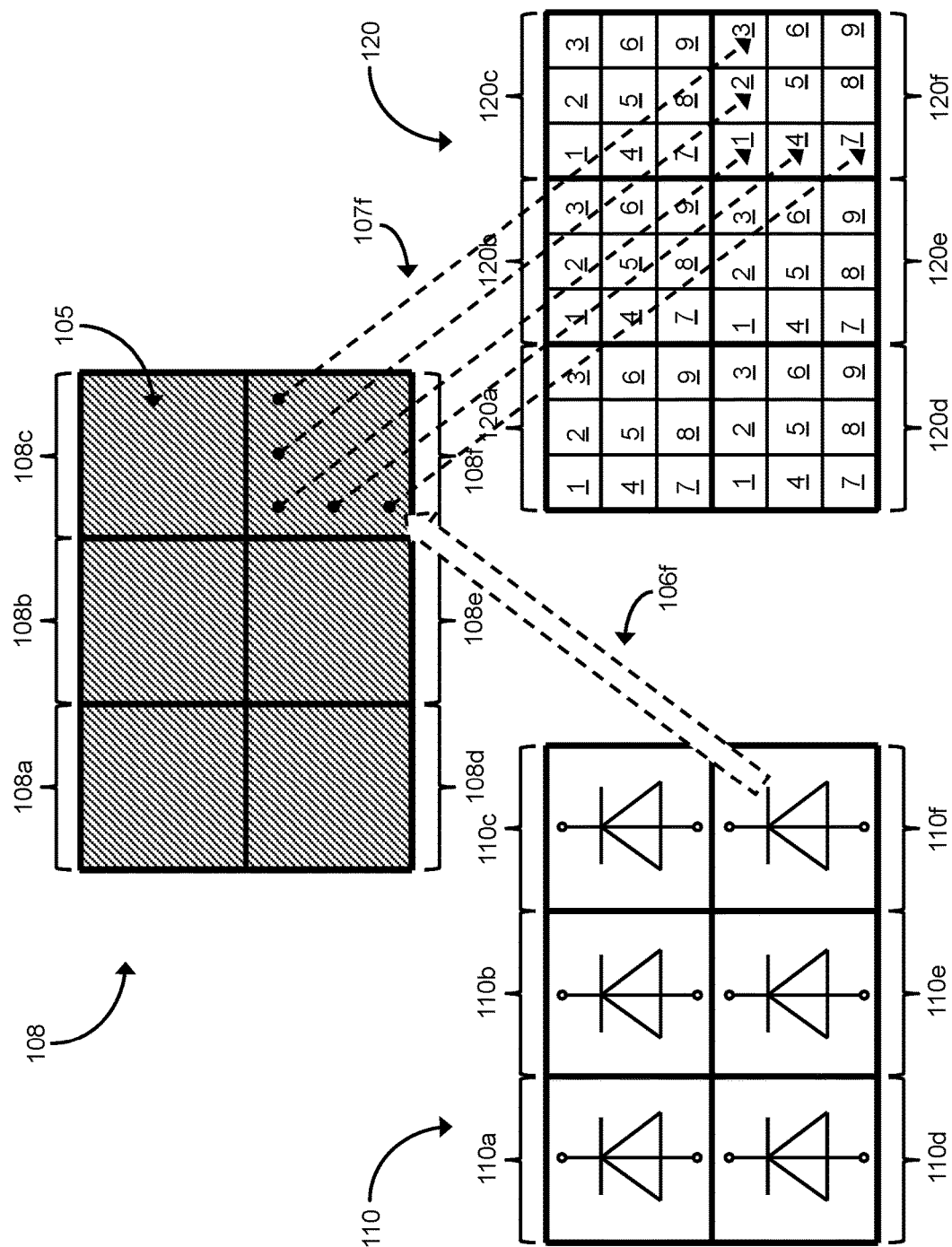

Following the transmission of the light beam pulses 106e by the illuminator 110e of the flash illuminator array 110 and the reception of the reflected light beam pulses 107e at the subset 120e of the flash detector array 120, the illuminator 110f can transmit one or more light beam pulses 106f to illuminate the area of the segment 108f, as shown in FIG. 2i. Such light beam pulses 106f transmitted by the illuminator 110f can impinge upon the target object 105 throughout the area of the segment 108f. For each light beam pulse 106f that impinges upon the portion of the target object 105 encompassed by the segment 108f, the light detectors 120f1-120f9 included in the subset 120f of the flash detector array 120 can each receive a reflected light beam pulse 107f corresponding to a frame of data. It is noted that only the light detectors 120f1-120f4 and 120f7 in the subset 120f of the flash detector array 120 are shown receiving reflected light beam pulses 107f for clarity of illustration, and that the remaining light detectors 120f5, 120f6, 120f8, and 120f9 in the subset 120f can also receive reflected light beam pulses 107f in likewise fashion.

Figure 2J:
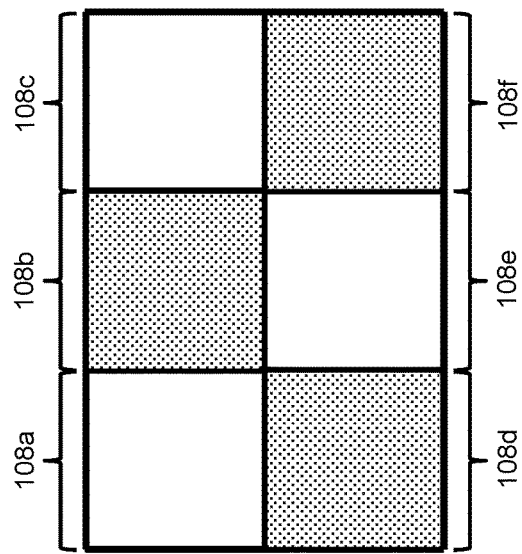
FIGS. 2j and 2k are diagrams illustrating a first exemplary scenario of scanning the field-of-view of FIG. 2a in segments.
Figure 2K:
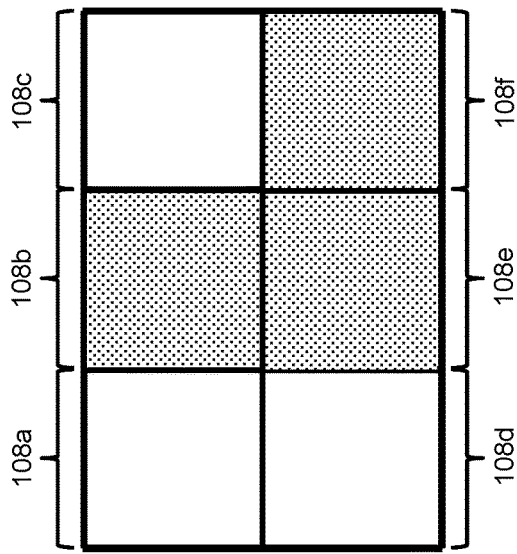

It is further noted that the signal processor/controller 130 of the flash LIDAR system 109 can continue to control the respective illuminators 110a-110f of the flash illuminator array 110 for scanning the field-of-view 108 in the same sequence of segments 108a through 108f, or in any other suitable sequence or order of the segments 108a-108f. For example, the signal processor/controller 130 may control the illuminators 110a-110f to selectively illuminate the respective segments 108a-108f starting with the segment 108a, and continuing, in turn, with the segment 108e and the segment 108c (see FIG. 2j), and then with the segment 108d, the segment 108b, and the segment 108f (see FIG. 2k), thereby selectively illuminating the entire area of the field-of-view 108 in segments.

Figure 2L:
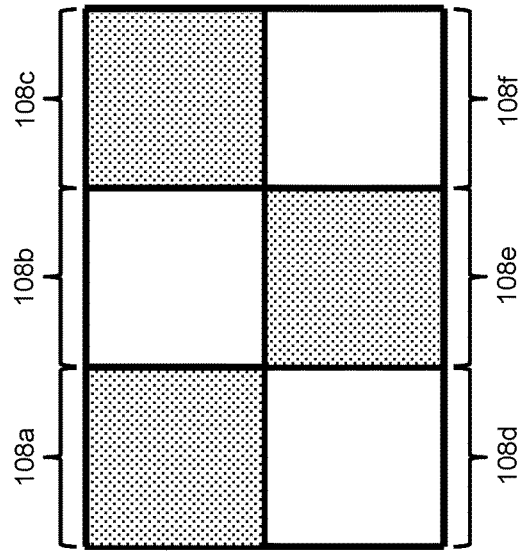
FIGS. 2l and 2m are diagrams illustrating a second exemplary scenario of scanning the field-of-view of FIG. 2a in segments.
Figure 2M:
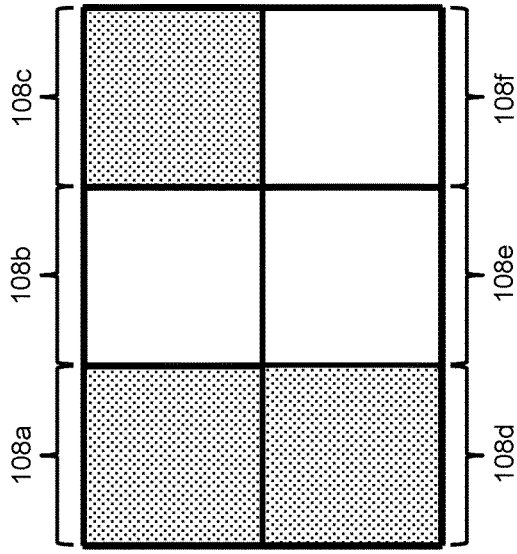

In certain embodiments, the signal processor/controller 130 may control the respective illuminators 110a-110f of the flash illuminator array 110 to scan the field-of-view 108 in segments using randomization in illumination direction. More specifically, the signal processor/controller 130 may control the illuminators 110a-110f to selectively illuminate the segments 108a-108f of the field-of-view 108 by randomly directing the transmitted light beam pulses 106a-106f toward the respective segments 108a-108f. For example, the signal processor/controller 130 may control the illuminators 110a, 110c, 110d to randomly direct, in turn, the light beam pulse 106d, the light beam pulse 106a, and the light beam pulse 106c toward the segment 108d, the segment 108a, and the segment 108c, respectively, as shown in FIG. 2l. The signal processor/controller 130 may further control the illuminators 110b, 110e, 110f to randomly direct, in turn, the light beam pulse 106f, the light beam pulse 106b, and the light beam pulse 106e toward the segment 108f, the segment 108b, and the segment 108e, respectively, as shown in FIG. 2m, thereby selectively illuminating the entire area of the field-of-view 108 in segments.

Not only can the signal processor/controller 130 control the respective illuminators 110a-110f of the flash illuminator array 110 to scan the field-of-view 108 in segments using randomization in illumination direction, but it can also control the respective illuminators 110a-110f to scan the field-of-view 108 in segments using randomization in illumination time. More specifically, the signal processor/controller 130 can control the illuminators 110a-110f to selectively illuminate the segments 108a-108f of the field-of-view 108, while inserting a random delay time between successive transmissions of the respective light beam pulses 106a-106f. For example, with reference to FIG. 2l, the signal processor/controller 130 may control the illuminators 110a, 110c, and 110d to insert a first random delay time of 4 microseconds between the transmission of the light beam pulse 106d illuminating the segment 108d and the transmission of the light beam pulse 106a illuminating the segment 108a, and to insert a second random delay time of 10 microseconds between the transmission of the light beam pulse 106a and the transmission of the light beam pulse 106c illuminating the segment 108c. Further, with reference to FIG. 2m, the signal processor/controller 130 may control the illuminators 110b, 110e, and 110f to insert a third random delay time of 7 microseconds between the transmission of the light beam pulse 106c and the transmission of the light beam pulse 106f illuminating the segment 108f, to insert a fourth random delay time of 12 microseconds between the transmission of the light beam pulse 106f and the transmission of the light beam pulse 106b illuminating the segment 108b, and to insert a fifth random delay time of 9 microseconds between the transmission of the light beam pulse 106b and the transmission of the light beam pulse 106e illuminating the segment 108e. By scanning the field-of-view 108 in segments using randomization in illumination direction and/or illumination time, the flash LIDAR system 109 can advantageously provide improved jamming resistance.

As described herein, each subset 120a, 120b, 120c, 120d, 120e, or 120f of the flash detector array 120 can operate to receive, in turn, a reflected light beam pulse 107a, 107b, 107c, 107d, 107e, or 107f from the portion of the target object 105 encompassed by its corresponding segment 108a, 108b, 108c, 108d, 108e, or 108f of the field-of-view 108. It is noted that a charge on a parasitic capacitance associated with at least one pixel receiver element (e.g., a photodiode) within one or more of the respective subsets 120a-120f may have to be discharged before that pixel receiver element can provide accurate information to the signal processor/controller 130. Such a parasitic capacitance Cp associated with the light detector 120a1 is illustrated in FIG. 3a. As shown in FIG. 3a, an output of the light detector 120a1 is connectable through a multiplexor (MUX) 301 (see also FIG. 3b) to a trans-impedance amplifier 311, which can operate to convert a current signal I1 (producible by the light detector 120a1 in response to a light beam pulse 107 impinging thereon) to a corresponding voltage signal V1. It is noted that the amplitude of the current signal I1 is generally a function of the intensity of the light beam pulse 107 impinging on the light detector 120a1. In certain embodiments, the trans-impedance amplifier 311 can include an operational amplifier 320, a feedback resistor Rf, as well as one or more switches SW1, SW2.

As further described herein, the signal processor/controller 130 of the flash LIDAR system 109 can control the respective illuminators 110a-110f of the flash illuminator array 110 to scan the field-of-view 108 in segments, selectively illuminating, in turn, the respective segments 108a-108f of the field-of-view 108 with transmitted light beam pulses 106a-106f, respectively. In certain embodiments, as each of the segments 108a-108f is being selectively illuminated, the signal processor/controller 130 can insert a predetermined or random delay time (e.g., at least one microsecond or tens of microseconds) between the transmission of one of the light beam pulses 106a-106f and the transmission of the next one of the light beam pulses 106a-106f. During one or more such predetermined or random delay times, the signal processor/controller 130 can actuate at least one of the switches SW1, SW2 of the trans-impedance amplifier 311 in order to discharge any charge on the parasitic capacitance Cp associated with the light detector 120a1. The signal processor/controller 130 can also cause any charge(s) on parasitic capacitances associated with the remaining light detectors 120a2-120a9, 120b1-120b9, 120c1-120c9, 120d1-120d9, 120e1-120e9, 120f1-120f9 of the flash detector array 120 to be discharged in likewise fashion. In this way, the flash LIDAR system 109 can assure that the light detectors in each subset 120a-120f of the flash detector array 120 provide accurate information (e.g., frames of data) when called upon to do so by the signal processor/controller 130.

FIG. 3b depicts a plurality of exemplary multiplexor/trans-impedance amplifier pairs 130a that can be included in the flash LIDAR system 109 of FIG. 1a. As shown in FIG. 3b, the plurality of multiplexor/trans-impedance amplifier pairs 130a include the MUX 301, multiplexors (MUXs) 302-309, the trans-impedance amplifier 311, and trans-impedance amplifiers 312-319. The MUX 301 is paired with the trans-impedance amplifier 311, the MUX 302 is paired with the trans-impedance amplifier 312, and so on up to the MUX 309, which is paired with the trans-impedance amplifier 319. It is noted that each of the trans-impedance amplifiers 312-319 can be configured like the trans-impedance amplifier 311. The trans-impedance amplifier 311 can operate to convert the current signal I1 (producible by the light detector 120a1, 120b1, . . . , or 120f1 in response to a light beam pulse 107 impinging thereon) to a corresponding voltage signal V1, the trans-impedance amplifier 312 can operate to convert a current signal I2 (producible by the light detector 120a2, 120b2, . . . , or 120f2 in response to a light beam pulse 107 impinging thereon) to a corresponding voltage signal V2, and so on up to the trans-impedance amplifier 319, which can operate to convert a current signal I9 (producible by the light detector 120a9, 120b9, . . . , or 120f9 in response to a light beam pulse 107 impinging thereon) to a corresponding voltage signal V9.

Further, outputs of the respective light detectors 120a1, 120b1, 120c1, 120d1, 120e1, 120f1 are each connectable through the MUX 301 to the trans-impedance amplifier 311, outputs of the respective light detectors 120a2, 120b2, 120c2, 120d2, 120e2, 120f2 are each connectable through the MUX 302 to the trans-impedance amplifier 312, and so on up to outputs of the respective light detectors 120a9, 120b9, 120c9, 120d9, 120e9, 120f9, which are each connectable through the MUX 309 to the trans-impedance amplifier 319. The signal processor/controller 130 can provide control signals Sel1, Sel2, . . . , Sel9 to the MUXs 301, 302, . . . , 309, respectively, in order to select which outputs of the respective light detectors are to be connected to the trans-impedance amplifiers 311, 312, . . . , 319. By inserting a predetermined or random delay time between the transmission of the light beam pulses 106a-106f, and, during one or more such predetermined or random delay times, actuating at least one of the switches SW1, SW2 of the respective trans-impedance amplifiers 311-319 to discharge any charge on a parasitic capacitance Cp associated with the respective light detectors 120a1, 120b1, . . . , 120f1, 120a2, 120b2, . . . , 120f2, . . . , 120a9, 120b9, . . . , 120f9, the flash LIDAR system 109 can advantageously assure that the light detectors in each subset 120a-120f of the flash detector array 120 provide accurate information to the signal processor/controller 130. Moreover, by multiplexing the respective light detectors 120a1, 120b1, . . . , 120f1, 120a2, 120b2, . . . , 120f2, . . . , 120a9, 120b9, . . . , 120f9 into the MUXs 301, 302, . . . , 309, respectively, the number of trans-impedance amplifiers required to operate the flash LIDAR system 109 can advantageously be reduced.

Figure 3C:
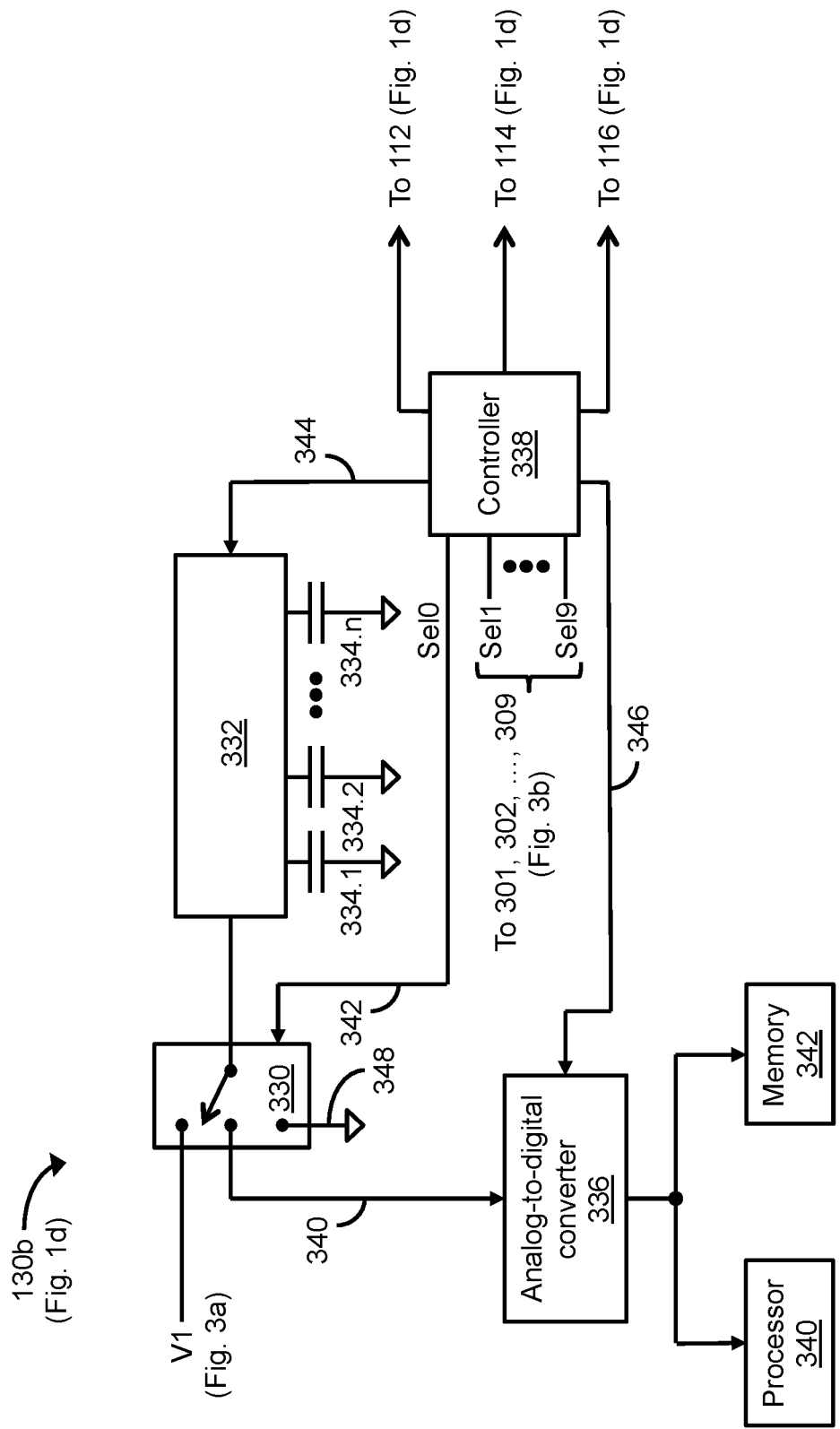

FIG. 3c depicts exemplary signal processing/control circuitry 130b that can be included in the flash LIDAR system 109 of FIG. 1a. Such signal processing/control circuitry 130b is described in U.S. Pat. No. 9,086,275 issued Jul. 21, 2015 entitled SYSTEM AND METHOD FOR LIDAR SIGNAL CONDITIONING, the disclosure of which is hereby incorporated herein by reference in its entirety. As shown in FIG. 3c, the signal processing/control circuitry 103b can include a switching network consisting of a switch 330 and an analog bidirectional multiplexer (MUX) 332, a plurality of analog storage elements (e.g., capacitors) 334.1, 334.2, . . . , 334.n, a controller 338, an analog-to-digital (A-to-D) converter 336, a processor 340, and a memory 342. It is noted that the signal processing/control circuitry 130b is depicted in FIG. 3c with reference to the voltage signal V1 provided at an output of the trans-impedance amplifier 311 (see FIG. 3b), and that corresponding signal processing/control circuitry can be provided for handling the voltage signals V2, V3, . . . , V9 produced by the trans-impedance amplifiers 312, 313, . . . , 319, respectively.

In an exemplary mode of operation, the controller 338 can provide, over a control line 342, a control signal Sel0 to the switch 330 in order to select the voltage signal V1 output for connection to the analog bidirectional MUX 332. Having connected the voltage signal V1 output to the analog bidirectional MUX 332, the controller 338 can provide, over a control line 344, one or more further control signals to cause the analog bidirectional MUX 332 to sequentially couple each of the analog storage elements 334.1, 334.2, . . . , 334.n to the voltage signal V1 output. The analog bidirectional MUX 332 can obtain multiple, sequential samples at consecutive times of the voltage signal V1 by successively coupling the voltage signal V1 output to each of the analog storage elements 334.1, 334.2, . . . , 334.*n*. For example, the voltage signal V1 output may be coupled to the analog storage element 334.1 for a first time period (e.g., ones or tens of microseconds), and then coupled to the analog storage element 334.2 for a second time period (e.g., ones or tens of microseconds), and so on, until the voltage signal V1 output has been successively coupled to each of the analog storage elements 334.1, 334.2, . . . , 334 for a corresponding time period, thereby allowing the analog storage elements 334.1, 334.2, . . . , 334.*n* to obtain and store multiple, sequential samples of the voltage signal V1.

Having obtained and stored multiple, sequential samples of the voltage signal V1, the controller 338 can provide, over the control line 342, a further control signal Sel0 to the switch 330 in order to connect the analog bidirectional MUX 332 to the A-to-D converter 336. The controller 338 can also provide, over the control line 344, one or more further control signals to cause the analog bidirectional MUX 332 to individually couple each of the analog storage elements 334.1, 334.2, . . . , 334.*n* to the A-to-D converter 336. Under control of the controller 338 (via a control line 346), the A-to-D converter 336 can convert the voltage stored on each analog storage element 334.1, 334.2, . . . , 334.*n* from analog form to digital form, and provide the voltages in digital form to the processor 340 for subsequent processing, and/or to the memory 342 for storage. Such digitized voltages derived from the voltage signals V1-V9 produced by the trans-impedance amplifiers 311-319, respectively, can form multiple frames of data, from which the processor 340 can determine the elapsed time between the transmission of the light beam pulse(s) 106 by the flash illuminator array 110 and the reception of the reflected light beam pulse(s) 107 at the flash detector array 120, and thereby obtain the range or distance 101 to the target object 105.

After processing the voltage signals V1-V9 produced by the trans-impedance amplifiers 311-319, respectively, the controller 338 can provide, over the control line 342, another control signal Sel0 to the switch 330 in order to connect the analog bidirectional MUX 332 to ground potential 348. Further, the controller 338 can also provide, over the control line 344, one or more additional control signals to cause the analog bidirectional MUX 332 to individually couple each of the analog storage elements 334.1, 334.2, . . . , 334.*n* to ground potential 348, thereby allowing each analog storage element 334.1, 334.2, . . . , 334.*n* to discharge its accumulated charge to ground. In this way, the analog storage elements 334.1, 334.2, . . . , 334.*n* can be readied for handling a new set of voltage signals V1, V2, . . . , V9 produced by the trans-impedance amplifiers 311, 312, . . . , 319, respectively.

Figure 4:
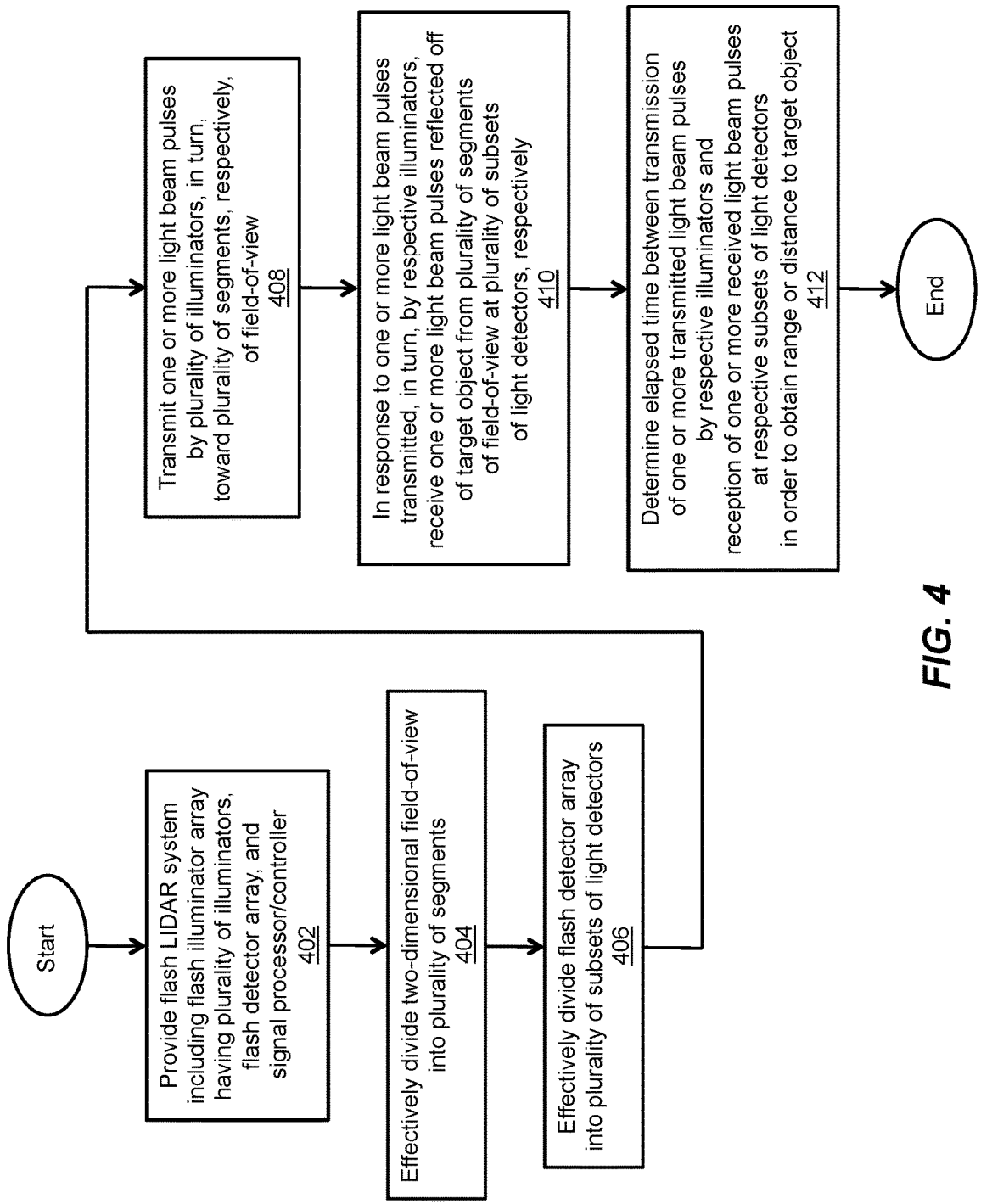

A method of using the flash LIDAR system 109 is described below with reference to FIG. 4. As depicted in block 402, the flash LIDAR system 109 is provided including the flash illuminator array 110 having a plurality of illuminators, the flash detector array 120, and the signal processor/controller 130. The flash LIDAR system 109 has the two-dimensional field-of-view 108 encompassing at least a portion of the target object 105. As depicted in block 404, the two-dimensional field-of-view 108 is effectively divided into a plurality of segments. Each illuminator of the flash illuminator array 110 is operative to illuminate a corresponding segment of the field-of-view 108. As depicted in block 406, the flash detector array 120 is effectively divided into a plurality of subsets of light detectors. Each subset of light detectors of the flash detector array 120 is operative to receive one or more reflected light beam pulses from a corresponding segment of the field-of-view 108. As depicted in block 408, one or more light beam pulses are transmitted by the plurality of illuminators, in turn, toward the plurality of segments, respectively, of the field-of-view 108. As depicted in block 410, in response to the one or more light beam pulses transmitted in turn by the respective illuminators, one or more light beam pulses reflected off of the target object 105 from the plurality of segments of the field-of-view 108 are received at the plurality of subsets of light detectors, respectively. As depicted in block 412, the elapsed time between the transmission of the one or more transmitted light beam pulses by the respective illuminators and the reception of the one or more received light beam pulses at the respective subsets of light detectors is determined in order to obtain the range or distance to the target object.

Figure 5:
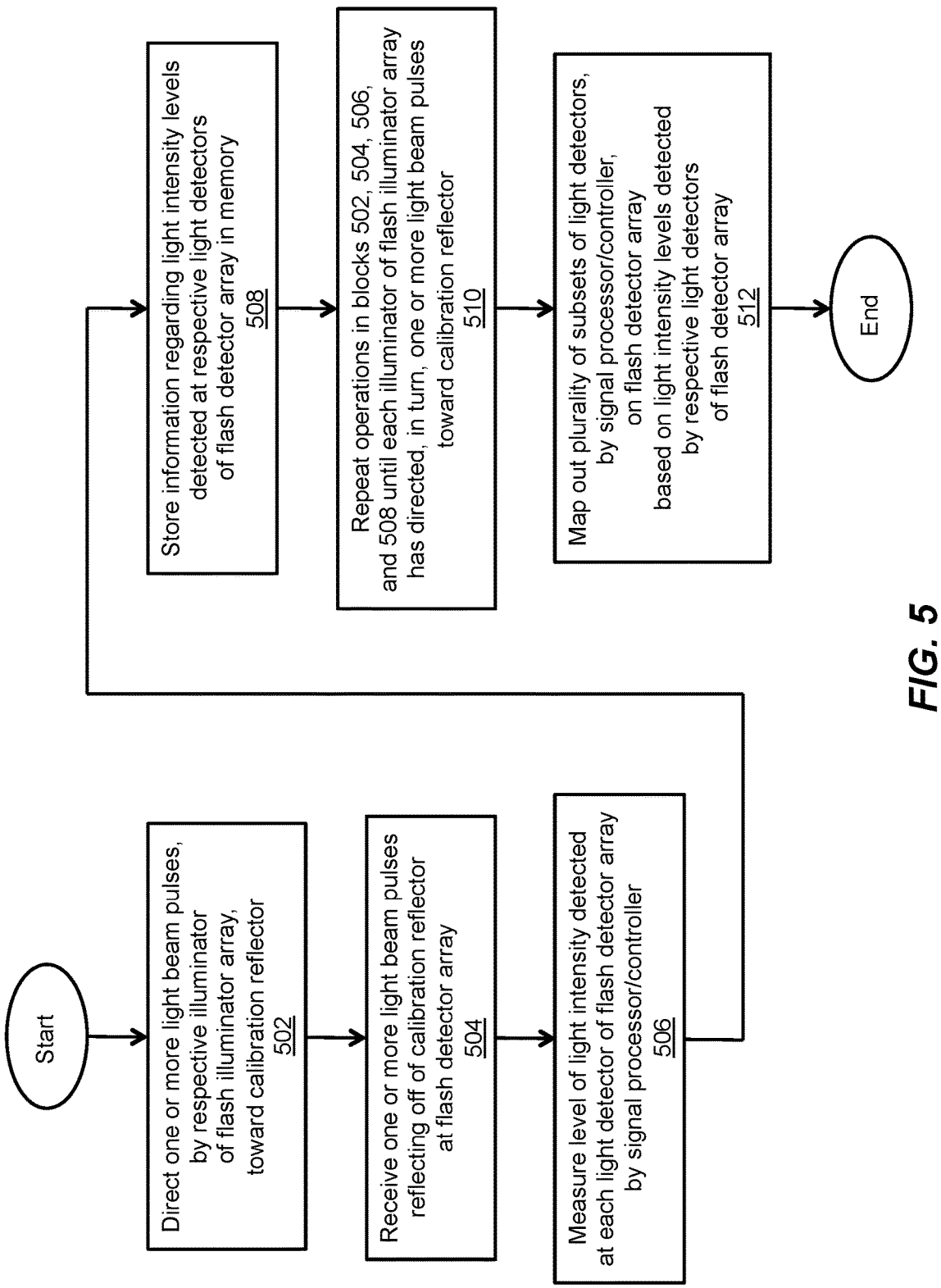
FIG. 5 is a flow diagram of an exemplary method of calibrating the array of light detectors of FIG. 2c, and mapping out a plurality of subsets of light detectors in the array of light detectors.

To further assure the accuracy of the information provided by the pixel receiver elements (e.g., photodiodes) of the flash detector array 120 within the flash LIDAR system 109, the signal processor/controller 130 can operate to calibrate the light detectors of the flash detector array 120, and to map out (or adjust a previous mapping of) a plurality of subsets of light detectors on the flash detector array 120 based on the light detector calibrations. An illustrative method of calibrating the light detectors of the flash detector array 120 and mapping out the plurality of subsets of light detectors is described below with reference to FIG. 5. In the method of FIG. 5, the target object 105 (see FIG. 1*d*) is replaced with a calibration reflector having a substantially uniform reflector surface. As depicted in block 502 (see FIG. 5), one or more light beam pulses 106 are directed, by a respective illuminator of the flash illuminator array 110 (see FIG. 1*d*), toward the calibration reflector. As depicted in block 504, one or more light beam pulses 107 reflecting off of the calibration reflector are received at the flash detector array 120 (see FIG. 1*d*). As depicted in block 506, the level of light intensity detected at each light detector of the flash detector array 120 is measured by the signal processor/controller 130 (see FIG. 1*d*). As depicted in block 508, information regarding the light intensity levels detected at the respective light detectors of the flash detector array 120 are stored, by the signal processor/controller 130, in memory. As depicted in block 510, the operations depicted in blocks 502, 504, 506, and 508 are repeated until each illuminator 110*a*, 110*b*, 110*c*, 110*d*, 110*e*, 110*f* of the flash illuminator array 110 has directed, in turn, one or more light beam pulses 106 toward the calibration reflector. As depicted in block 512, a plurality of subsets of light detectors are mapped out, by the signal processor/controller 130, on the flash detector array 120 based on the light intensity levels detected by the respective light detectors of the flash detector array 120.

With regard to block 512 (see FIG. 5), each subset of light detectors can be mapped out on the flash detector array 120 based on each light detector in the subset having detected a predetermined light intensity level resulting from one or more light beam pulses produced by a corresponding illuminator of the flash illuminator array 110. In certain embodiments, the plurality of subsets of light detectors can be mapped out on the flash detector array 120 such that the area of each subset is less than the area of the flash detector array 120 in which light detectors detected as least the predetermined light intensity level. For example, as shown in FIG. 6, the mapped area of the subset 120*b* (see also FIG. 2*e*) may be less than an area 602 of the flash detector array 120 in which light detectors (such as the light detectors 120*a*3, 120*a*6, 120*a*9, 120*c*1, 120*c*4, 120*c*7, 120*d*3, 120*e*1, 120*e*2, 120*e*3, and 120*f*1; see FIG. 2*d*) detected at least the predetermined light intensity level resulting from the light beam pulses 106b produced by the illuminator 110b.

In certain further embodiments, the plurality of subsets of light detectors can be mapped out on the flash detector array 120 such that the area of each subset is greater than the area of the flash detector array 120 in which light detectors detected as least the predetermined light intensity level. For example, as shown in FIG. 7a, the mapped area of the subset 120a (see also FIG. 2d) may be greater than an area 702 of the flash detector array 120 in which light detectors (such as the light detectors 120a1, 120a2, 120a4, and 120a5; see FIG. 7a) detected at least the predetermined light intensity level resulting from the light beam pulses 106a produced by the illuminator 110a. Similarly, the mapped area of the subset 120a may be greater than an area 704 (see FIG. 7b) of the flash detector array 120 in which light detectors (such as the light detectors 120a5, 120a6, 120a8, and 120a9; see FIG. 7b) detected at least the predetermined light intensity level; the mapped area of the subset 120a may be greater than an area 706 (see FIG. 7c) of the flash detector array 120 in which light detectors (such as the light detectors 120a2, 120a3, 120a5, and 120a6; see FIG. 7c) detected at least the predetermined light intensity level; and, the mapped area of the subset 120a may be greater than an area 708 (see FIG. 7d) of the flash detector array 120 in which light detectors (including the light detectors 120a4, 120a5, 120a7, and 120a8; see FIG. 7d) detected at least the predetermined light intensity level. In this way, a sometimes error-prone mechanical calibration of the flash detector array 120 within the flash LIDAR system 109 can advantageously be avoided.

Figure 8:
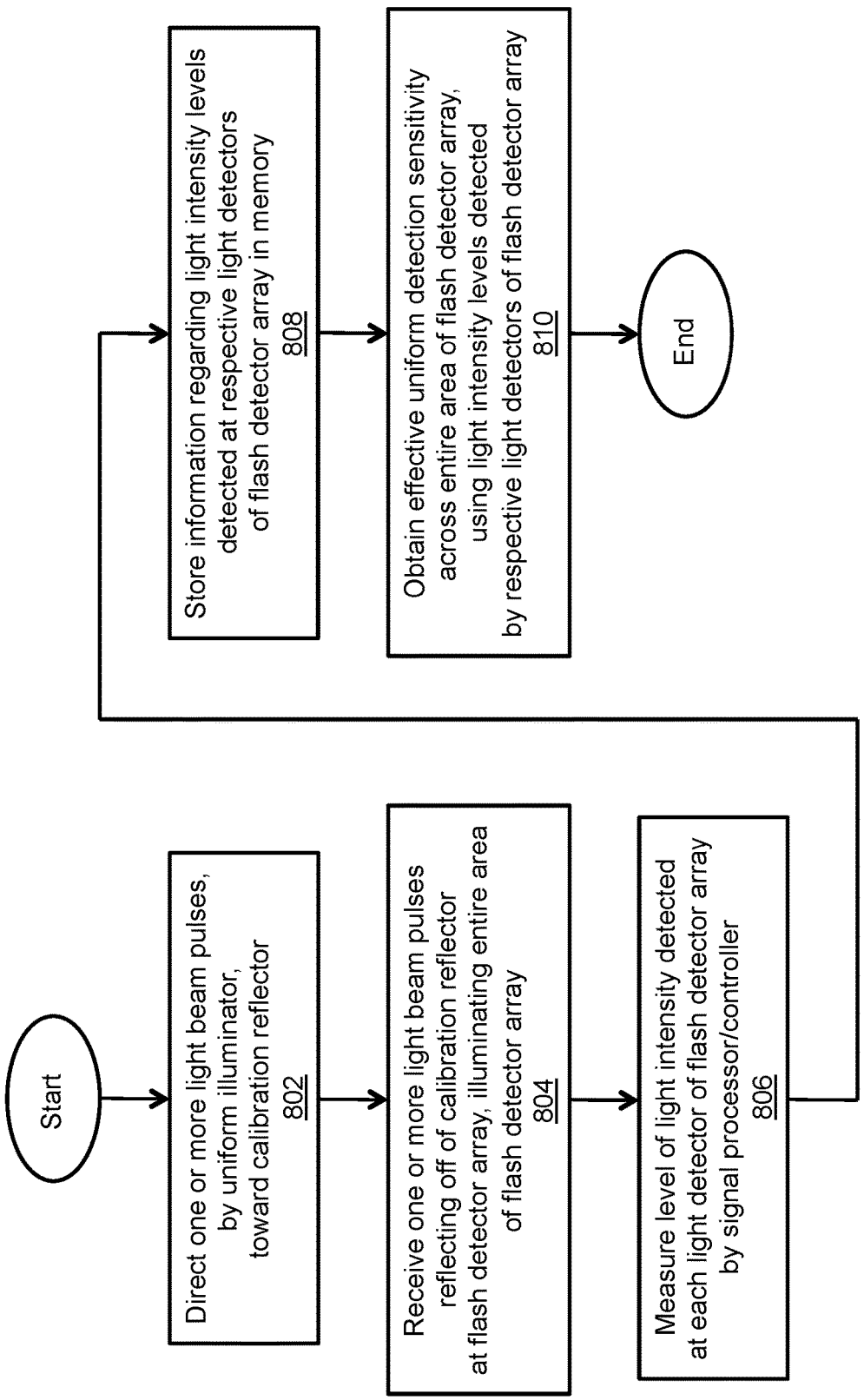
FIG. 8 is a flow diagram of an exemplary method of an initial calibration of the array of light detectors of FIG. 2c.

In the event the light detectors of the flash detector array 120 are not well spectrally matched with the illuminators of the flash illuminator array 110 or vary in sensitivity, an initial calibration of the light detectors of the flash detector array 120 can also be performed. An illustrative method of such an initial calibration is described below with reference to FIG. 8. In the method of FIG. 8, the target object 105 is again replaced with a calibration reflector having a substantially uniform reflector surface. Further, the flash illuminator array 110 is replaced with a uniform illuminator that can uniformly illuminate the entire field-of-view 108 encompassing at least a portion of the calibration reflector. As depicted in block 802 (see FIG. 8), one or more light beam pulses are directed, by the uniform illuminator, toward the calibration reflector. As depicted in block 804, one or more light beam pulses reflecting off of the calibration reflector are received at the flash detector array 120, illuminating an entire area of the flash detector array 120. As depicted in block 806, the level of light intensity detected at each light detector of the flash detector array 120 is measured by the signal processor/controller 130. As depicted in block 808, information regarding the light intensity levels detected at the respective light detectors of the flash detector array 120 are stored, by the signal processor/controller 130, in memory. As depicted in block 810, an effective uniform detection sensitivity is obtained across the entire area of the flash detector array 120, using the light intensity levels detected by the respective light detectors of the flash detector array 120.

With regard to block 810 (see FIG. 8), in certain embodiments, such an effective uniform detection sensitivity across the entire area of the flash detector array 120 can be obtained, by the signal processor/controller 130, by performing a software adjustment of the light intensity levels detected by the respective light detectors. In certain further embodiments, such an effective uniform detection sensitivity across the entire area of the flash detector array 120 can be obtained, by the signal processor/controller 130, by adjusting (via one or more control signals Adj1, Adj2, . . . , Adj9; see FIG. 3b) the gain of one or more of the trans-impedance amplifiers 301-309. It is noted that any other suitable technique for obtaining uniform detection sensitivity across the flash detector array 102 may be employed.

It should be appreciated that various embodiments of the present application may be implemented at least in part in any conventional computer programming language. For example, some embodiments may be implemented in a procedural programming language (e.g., "C"), or in an object oriented programming language (e.g., "C++"). Other embodiments of the present application may be implemented as preprogrammed hardware elements (e.g., application specific integrated circuits (ASICs), field programmable gate arrays (FPGAs), digital signal processors (DSPs)), or other related components.

In an alternative embodiment, the disclosed systems, apparatuses, and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the disclosed systems.

Those skilled in the art should also appreciate that such computer instructions can be written in a number of programming languages for use with many computer architectures or operating systems. Further, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments of the present application may be implemented as a combination of both software (e.g., a computer program product) and hardware. Still other embodiments of the present application may be implemented as entirely hardware, or entirely software.

The embodiments of the present application described above are intended to be merely exemplary. Numerous variations and modifications will be apparent to those skilled in the art. All such variations and modifications are intended to be within the scope of the present application, as defined in any appended claims.

What is claimed is:

1. A flash optical detection system having a field-of-view configured to encompass at least a portion of a target object, the system comprising:
   a flash illuminator including a plurality of illuminators;
   a flash detector array including a plurality of light detectors, the flash detector array being divided into a plurality of subsets of light detectors, the subsets of light detectors mapped to correspond with respective segments of the field-of-view; and
   a signal processor,
   wherein the plurality of illuminators are operative to illuminate the respective segments of the field-of-view, the plurality of illuminators being further operative to transmit, in turn, one or more light beam pulses toward corresponding segments, respectively, of the field-of-view, wherein the plurality of subsets of light detectors are operative, in response to the one or more light beam pulses transmitted, in turn, by the respective illuminators, to receive one or more reflected light beam pulses from the plurality of segments, respectively, of the field-of-view, and wherein the signal processor is operative to determine an elapsed time between transmission of the one or more light beam pulses by the respective illuminators and reception of the one or more reflected light beam pulses at the respective subsets of light detectors in order to obtain a range to the target object.

2. The system of claim 1 further comprising:
a plurality of controllable media or devices having controllable refraction angles, wherein each of at least some of the plurality of illuminators is operative to transmit the one or more light beam pulses toward the corresponding segments, respectively, of the field-of-view through a respective one of the plurality of controllable media or devices.

3. The system of claim 1 wherein the plurality of illuminators are operative transmit, in turn, the one or more light beam pulses toward the corresponding segments, respectively, of the field-of-view in a predetermined sequence of segments.

4. The system of claim 1 wherein the plurality of illuminators are operative to transmit, in turn, the one or more light beam pulses toward the corresponding segments, respectively, of the field-of-view in a random order of segments.

5. The system of claim 1 wherein the signal processor is further operative to control transmission of the one or more light beam pulses toward the corresponding segments, respectively, of the field-of-view by inserting a random time delay between one or more successive transmissions of the one or more light beam pulses.

6. The system of claim 1 wherein each of the plurality of subsets of light detectors includes a predetermined number of light detectors, and wherein the system further includes a quantity of multiplexor/trans-impedance amplifier pairs equal to the predetermined number of light detectors in each subset.

7. The system of claim 6 wherein corresponding light detectors across the plurality of subsets of light detectors are coupled to current inputs of the respective multiplexor/trans-impedance amplifier pairs.

8. The system of claim 7 wherein the signal processor is further operative to provide first control signals to the respective multiplexor/trans-impedance amplifier pairs to select the corresponding light detectors at the current inputs of the plurality of multiplexor/trans-impedance amplifier pairs.

9. The system of claim 8 wherein the signal processor is further operative to provide second control signals to the respective multiplexor/trans-impedance amplifier pairs to control amplifier gains provided by the respective multiplexor/trans-impedance amplifier pairs.

10. The system of claim 9 wherein the signal processor is coupled to voltage outputs of the respective multiplexor/trans-impedance amplifier pairs, the signal processor being further operative to determine the elapsed time between the transmission of the one or more light beam pulses by the respective illuminators and the reception of the one or more reflected light beam pulses at the respective subsets of light detectors based on voltages provided at the respective voltage outputs of the multiplexor/trans-impedance amplifier pairs.

11. A method of operating a flash optical detection system having a field-of-view configured to encompass at least a portion of a target object, the method comprising:
illuminating, by a plurality of illuminators, corresponding segments, respectively, of the field-of-view by transmitting, in turn, one or more light beam pulses toward corresponding segments, respectively, of the field-of-view;

in response to the one or more light beam pulses transmitted, in turn, by the respective illuminators, receiving, by a plurality of subsets of light detectors, one or more reflected light beam pulses from the plurality of segments, respectively, of the field-of-view, the subsets of light detectors mapped to correspond with respective segments of the field-of-view; and determining, by the signal processor, an elapsed time between transmission of the one or more light beam pulses by the respective illuminators and reception of the one or more reflected light beam pulses at the respective subsets of light detectors in order to obtain a range to the target object.

12. The method of claim 11 wherein the transmitting of the one or more light beam pulses includes transmitting, in turn, the one or more light beam pulses toward the corresponding segments, respectively, of the field-of-view in a predetermined sequence of segments.

13. A method of calibrating a flash optical detection system, the method comprising:
transmitting, by a plurality of illuminators, in turn, one or more light beam pulses toward a calibration reflector, the calibration reflector having a substantially uniform reflector surface;

in response to the one or more light beam pulses transmitted, in turn, by the illuminators, receiving, at the plurality of light detectors, one or more reflected light beam pulses from the calibration reflector; and generating a map, by the signal processor, of a plurality of subsets of light detectors on a flash detector array using measured light intensity levels, each subset of light detectors for use in receiving further reflected light beam pulses in response to further transmitted light beam pulses from a respective segment of a field-of-view addressed by the one or more light beam pulses.

14. The method of claim 13 wherein the generating the map of the plurality of subsets of light detectors on the flash detector array includes generating a map of an area of at least one subset of light detectors to be less than a total area of the flash detector array in which a least one light detector has a measured light intensity level equal to at least a predetermined light intensity level.

15. The method of claim 13 wherein the generating the map of the plurality of subsets of light detectors on the flash detector array includes venerating a map of an area of at least one subset of light detectors to be greater than a total area of the flash detector array in which a least one light detector has a measured light intensity level equal to at least a predetermined light intensity level.

16. An optical detection system having a field-of-view configured to encompass at least a portion of a target object, the system comprising:
an illuminator;
a detector including a plurality of light detectors, the detector being divided into a plurality of subsets of light detectors, the subsets of light detectors mapped to correspond with respective segments of the field-of-view; and a signal processor, wherein the illuminator is operative to illuminate, successively, via one or more light beam pulses, the respective segments of the field-of-view, wherein the light detectors are operative, in response to the one or more light beam pulses transmitted, in turn, to receive one or more reflected light beam pulses, and wherein the signal processor is operative to determine an elapsed time between transmission of the one or more light beam pulses by the illuminator and reception of the one or more reflected light beam pulses at the one or more light detectors in order to determine a range to the target object.

17. The system of claim 16 further comprising:
a controllable medium or device having controllable refraction angles, wherein the illuminator is operative to transmit the one or more light beam pulses toward corresponding segments, respectively, of the field-of-view through the controllable medium or device.

18. The system of claim 2 wherein the signal processor/controller is further operative to control the refraction angle of the controllable medium or device to direct the one or more light beam pulses transmitted by the illuminator toward corresponding segments, respectively, of the field-of-view.

19. The system of claim 2 wherein the controllable medium or device includes at least one of a lithium niobate (LiNbO$_3$) crystal medium or a liquid crystal waveguide device.

20. The system of claim 1 wherein the plurality of illuminators are operative to transmit, in turn, the one or more light beam pulses toward the corresponding segments, respectively, of the field-of-view in a predetermined sequence of segments.

21. The system of claim 1 wherein the plurality of illuminators are operative to transmit, in turn, the one or more light beam pulses toward the corresponding segments, respectively, of the field-of-view in a random order of segments.

22. The system of claim 1 wherein the signal processor is further operative to control transmission of the one or more light beam pulses toward the corresponding segments, respectively, of the field-of-view by inserting a random time delay between one or more successive transmissions of the one or more light beam pulses.

23. The system of claim 2 wherein the signal processor is further operative to control the refraction angle of each controllable medium or device to direct the one or more light beam pulses transmitted by the plurality of illuminators toward the corresponding segments, respectively, of the field-of-view.

24. The system of claim 2 wherein the plurality of controllable media or devices include at least one of a lithium niobate (LiNbO$_3$) crystal medium or a liquid crystal waveguide device.

25. The method of claim 11 wherein the transmitting of the one or more light beam pulses includes transmitting, in turn, the one or more light beam pulses toward the corresponding segments, respectively, of the field-of-view in a random order of segments.

26. The method of claim 11 further comprising:
controlling, by the signal processor, transmission of the one or more light beam pulses toward the corresponding segments, respectively, of the field-of-view by inserting a random time delay between one or more successive transmissions of the one or more light beam pulses.

27. The method of claim 13 wherein the generating the map of the plurality of subsets of light detectors on the flash detector array includes generating a map of the plurality of subsets such that each light detector in a respective subset has a measured light intensity level equal to at least a predetermined light intensity level.

* * * * *

UNITED STATES PATENT AND TRADEMARK OFFICE
CERTIFICATE OF CORRECTION

PATENT NO. : 10,429,496 B2  
APPLICATION NO. : 15/166360  
DATED : October 1, 2019  
INVENTOR(S) : Harvey Weinberg Page 1 of 1

It is certified that error appears in the above-identified patent and that said Letters Patent is hereby corrected as shown below:

Column 17, Line 26, Claim 3, after "operative", insert --to--

Column 18, Line 57, Claim 15, delete "venerating" and insert --generating-- therefor Signed and Sealed this  
Seventh Day of April, 2020

Andrei Iancu  
*Director of the United States Patent and Trademark Office*